(12) United States Patent
Huo et al.

(10) Patent No.: US 12,432,310 B2
(45) Date of Patent: Sep. 30, 2025

(54) METHOD TO ADJUST IMAGE EFFECTS WHEN USING SCANNER REDIRECTION

(71) Applicant: Omnissa, LLC, Mountain View, CA (US)

(72) Inventors: Huiyong Huo, Beijing (CN); Zhongzheng Tu, Beijing (CN); Ning Ge, Beijing (CN); Kai Xiang, Beijing (CN); Mingsheng Zang, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 326 days.

(21) Appl. No.: 18/165,548

(22) Filed: Feb. 7, 2023

(65) Prior Publication Data
US 2024/0205357 A1    Jun. 20, 2024

(30) Foreign Application Priority Data

Dec. 20, 2022 (WO) ................ PCT/CN2022/140234

(51) Int. Cl.
    *H04N 5/262*      (2006.01)
    *G06F 9/451*      (2018.01)
(52) U.S. Cl.
    CPC ........... *H04N 5/2621* (2013.01); *G06F 9/452* (2018.02)
(58) Field of Classification Search
    CPC .............................. H04N 5/2621; G06F 9/452
    See application file for complete search history.

(56) References Cited

U.S. PATENT DOCUMENTS

| | | |
|---|---|---|
| 7,012,706 B1 | 3/2006 | Hansen |
| 8,634,673 B1* | 1/2014 | McDougal ................ G06T 5/00 |
| | | 382/274 |
| 8,913,285 B1 | 12/2014 | Neubrand |
| 9,489,471 B2 | 11/2016 | Venkatesh |
| 10,230,855 B1 | 3/2019 | Sarreo et al. |
| 10,536,559 B2 | 1/2020 | Vajravel |
| 11,716,428 B1 | 8/2023 | Tu et al. |
| 11,750,749 B1 | 9/2023 | Tu et al. |
| 2006/0023951 A1 | 2/2006 | Tan |

(Continued)

OTHER PUBLICATIONS

International Search Report dated May 16, 2023 in related PCT application PCT/US23/11293, 16 pages.

(Continued)

*Primary Examiner* — Yogesh K Aggarwal
(74) *Attorney, Agent, or Firm* — Kim & Stewart LLP

(57) ABSTRACT

A scanner redirection method for a remote desktop system, wherein the remote desktop system includes a client computing device and a remote server, and the client computing device includes remote desktop software, includes the steps of: receiving from the remote server, settings that were selected by a user for adjusting an image that is to be created by an image capturing device; in response to receiving the selected settings from the remote server, transmitting to the image capturing device, at least a first setting of the selected settings from the remote server; and after the image capturing device creates the image, storing the image, wherein the first setting has been applied to the image by the image capturing device to adjust an effect of the image, and a second setting has been applied to the image by software of the remote desktop system to adjust another effect of the image.

20 Claims, 18 Drawing Sheets

(56) References Cited

U.S. PATENT DOCUMENTS

| | | |
|---|---|---|
| 2006/0070090 A1 | 3/2006 | Gulkis |
| 2007/0050616 A1 | 3/2007 | Masui et al. |
| 2008/0137129 A1 | 6/2008 | Ferlitsch |
| 2008/0239329 A1 | 10/2008 | Kitada et al. |
| 2009/0141931 A1 | 6/2009 | Yadid-Pecht et al. |
| 2009/0237728 A1 | 9/2009 | Yamamoto |
| 2009/0284807 A1 | 11/2009 | Niculescu |
| 2010/0079797 A1 | 4/2010 | Ohara |
| 2010/0223340 A1 | 9/2010 | Pope et al. |
| 2010/0296120 A1 | 11/2010 | Hanano |
| 2010/0315675 A1 | 12/2010 | Yagi |
| 2011/0013003 A1 | 1/2011 | Thompson et al. |
| 2011/0016475 A1 | 1/2011 | Merna |
| 2011/0051190 A1 | 3/2011 | Abe |
| 2011/0055765 A1 | 3/2011 | Neubrand et al. |
| 2012/0167208 A1 | 6/2012 | Buford et al. |
| 2013/0054543 A1 | 2/2013 | Brown |
| 2014/0118767 A1 | 5/2014 | Kim et al. |
| 2015/0055197 A1 | 2/2015 | Romanoff et al. |
| 2016/0006888 A1 | 1/2016 | Migishima et al. |
| 2016/0006901 A1 | 1/2016 | Torigoshi et al. |
| 2017/0289313 A1 | 10/2017 | Vajravel |
| 2018/0082093 A1 | 3/2018 | Crooks et al. |
| 2018/0234517 A1 | 8/2018 | Venkatesh |
| 2018/0255238 A1* | 9/2018 | Matias .................. G11B 27/10 |
| 2019/0064510 A1 | 2/2019 | Flohr |
| 2019/0394343 A1 | 12/2019 | Sahara |
| 2020/0310704 A1 | 10/2020 | Hanano |
| 2021/0141579 A1 | 5/2021 | Yuan et al. |
| 2021/0227083 A1 | 7/2021 | Shiraishi |
| 2021/0344780 A1 | 11/2021 | Tomes |
| 2024/0020136 A1 | 1/2024 | Tu et al. |
| 2024/0020137 A1 | 1/2024 | Tu et al. |
| 2024/0022670 A1 | 1/2024 | Tu et al. |

OTHER PUBLICATIONS

Dynamsoft "Document Scanner—TWAIN, WIA, ISIS or SANE," Jan. 7, 2020, 8 pages, Retrieved from the Internet Aug. 28, 2022 URL: https://www.dynamsoftcom/blog/insights/document-scanning-twain-wia-isis-sane/.

Twain Resource Site—Home Page, 2022, 4 pages, Retrieved from the Internet Aug. 28, 2022 URL: https://twain.org.

Notice of Allowance mailed Mar. 24, 2023 in related U.S. Appl. No. 17/897,822.

Non-Final Office Action mailed Apr. 17, 2023 in related U.S. Appl. No. 17/897,780.

Notice of Allowance mailed Apr. 28, 2023 in related U.S. Appl. No. 17/897,801.

Non-Final Office Action mailed Feb. 2, 2024 in U.S. Appl. No. 17/897,842, 31 pages.

Non-Final Office Action mailed Feb. 15, 2024 in U.S. Appl. No. 17/897,866, 34 pages.

* cited by examiner

METHOD TO ADJUST IMAGE EFFECTS WHEN USING SCANNER REDIRECTION

CROSS-REFERENCE

This application is based upon and claims the benefit of priority from International Patent Application No. PCT/CN2022/140234, filed on Dec. 20, 2022, the entire contents of which are incorporated herein by reference.

BACKGROUND

Many organizations rely on remote desktop (RD) services to provide lean, flexible computing environments. RD scanning is one important feature required by the end user of an RD service. Through RD scanning, an application executing on a remote server acquires an image from a client-side image capturing device such as a scanner or digital camera. Specifically, through scanner redirection, the remote server transmits a request to a client computing device for one or more images, the client computing device being connected to the image capturing device. The client computing device then acquires the image(s) from the image capturing device and transmits them to the remote server.

Image capturing devices vary in the settings that they can adjust for images they create. For example, some image capturing devices can adjust image effects through settings such as orientation, rotation, brightness, contrast, and gamma. However, other image capturing devices do not support these functionalities. When using scanner redirection, it is desirable to allow the end user to adjust such image effects even when an image capturing device itself does not provide such functionalities.

SUMMARY

Accordingly, one or more embodiments provide for an RD system, wherein the RD system includes a client computing device and a remote server, and the client computing device includes RD software. The RD software includes a scanner core that is configured to communicate with an image capturing device. According to some embodiments, the scanner core is a "data source" of the client computing device. According to other embodiments, the scanner core is an "image capture core" of the client computing device. As used herein, an "image capture core" is a service running in an operating system (OS) that exposes application programming interfaces (APIs) for communicating with one or more connected image capturing devices. For example, the APIs are used to discover settings supported by the image capturing devices and to instruct the image capturing devices to perform their native functions.

The scanner redirection method according to one or more embodiments includes the steps of: receiving from the remote server, settings that were selected by a user for adjusting an image that is to be created by the image capturing device; in response to receiving the selected settings from the remote server, transmitting to the image capturing device, at least a first setting of the selected settings from the remote server; and after the image capturing device creates the image, storing the image, wherein the first setting has been applied to the image by the image capturing device to adjust an effect of the image, and a second setting has been applied to the image by software of the remote desktop system to adjust another effect of the image.

Further embodiments include a non-transitory computer-readable storage medium comprising instructions that cause an RD system to carry out the above scanner redirection method, as well as an RD system configured to carry out the above scanner redirection method.

DETAILED DESCRIPTION

Techniques for realizing scanner redirection during an RD session between a client computing device and a remote server, are described. A VM running in the remote server executes an application that consumes one or more images from an image capturing device (ICD). The ICD is connected to the client computing device. To acquire the images, the application of the remote server requests the images from an application of the client computing device, referred to as an RD client application. The RD client application acquires the images from the ICD and transmits them to the application of the remote server.

Before the application of the remote server requests the images, a user adjusts various settings to be applied to the images. Some of the settings are supported by the ICD, while other settings are not. For example, the ICD may support changing between color mode and gray mode but may not support changing orientation. For settings that are supported by the ICD, the ICD applies the image effects to the images. Then, for settings that are not supported by the ICD, the image effects are applied by software executing in either the client computing device or the remote server.

According to some embodiments, the RD client application and the application of the remote server utilize the same scanning protocol such as the TWAIN protocol. Pursuant to the common scanning protocol, the RD client application and the application of the remote server each utilize a "data source manager" and a "data source." For the application of the remote server, the data source manager communicates with a "virtual" data source that requests images from the client computing device. For the RD client application, the data source manager communicates with a data source that acquires images from ICDs.

According to other embodiments, the client computing device and the VM in the remote server have different OSs. As a result, the RD client application and the application of the remote server utilize different scanning protocols such as the Image Capture (ICA) framework and the TWAIN protocol. Pursuant to its scanning protocol, the application of the remote server still utilizes a data source manager and a virtual data source. Pursuant to the other scanning protocol, the RD client application utilizes an "image capture core" that communicates directly with the ICDs to acquire images therefrom. These and further aspects of the invention are discussed below with respect to the drawings.

Figure 1:
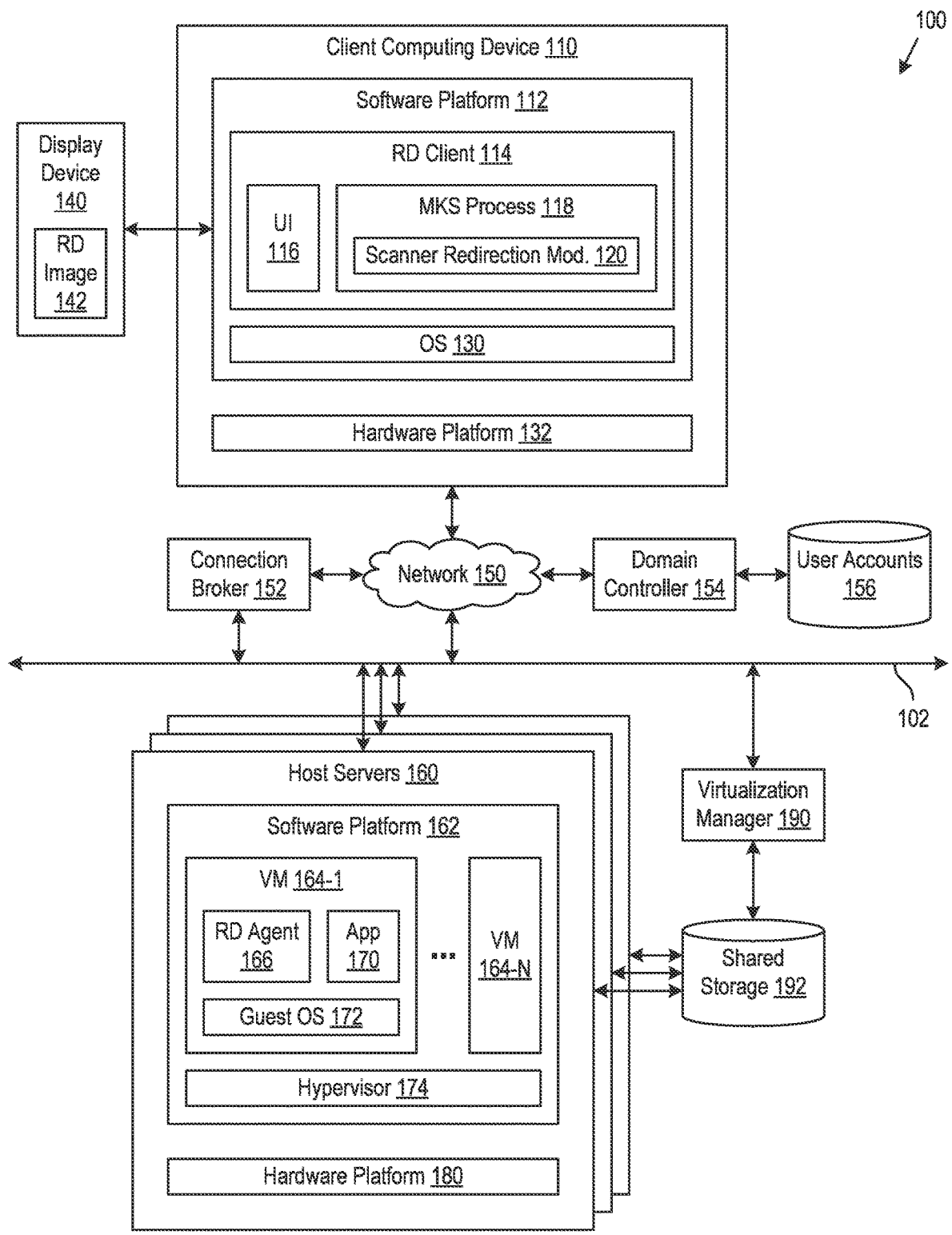
FIG. 1 is a block diagram of an RD system in which embodiments may be implemented.

FIG. 1 is a block diagram of an RD system 100 in which embodiments may be implemented. RD system 100 includes a client computing device 110 and a plurality of host servers 160 that are remote from client computing device 110. For example, client computing device 110 may be a laptop, a desktop computer, or a server in a private data center controlled by a particular organization. Host servers 160 may be provisioned in a private data center controlled by the particular organization or provisioned in a public data center that includes servers of other organizations.

Client computing device 110 is constructed on a hardware platform 132 such as an x86 architecture platform. Hardware platform 132 includes conventional components of a computing device (not shown), such as one or more central processing units (CPUs), memory such as random-access memory (RAM), local storage such as one or more magnetic drives or solid-state drives (SSDs), and one or more network interface cards (NICs). The CPU(s) are configured to execute instructions such as executable instructions that perform one or more operations described herein, which may be stored in the memory. The NIC(s) enable client computing device 110 to communicate with host servers 160 over a network 150 such as the Internet.

Hardware platform 132 supports a software platform 112, which includes an RD client software program 114 running on an OS 130. OS 130 is a commodity OS. RD client 114 includes a user interface (UI) 116 through which a user interacts with the RD session, and a mouse, keyboard, screen (MKS) process 118. The term "desktop" in remote desktop refers to an instance of an interactive environment provided by an OS and software applications, typically in the form of display and sound output and keyboard and mouse input. Through UI 116, the user accesses an RD from any location. One of host servers 160 transmits an image 142 of the RD to MKS process 118. RD client 114 then communicates with a display device 140 such as a monitor on which the user views RD image 142. For example, RD client 114 may be VMware Horizon® client, available from VMware, Inc.

When the user performs actions in the RD such as clicking a mouse or typing on a keyboard, the user's actions are transmitted to MKS process 118. MKS process 118 transmits the user's actions to one of host servers 160 to update the user's RD accordingly. MKS process 118 includes a scanner redirection module 120 that acquires images from one or more ICDs (not shown in FIG. 1) connected to client computing device 110. Scanner redirection module 120 transmits such images to host server 160.

RD system 100 includes a domain controller 154 such as Microsoft Active Directory®. Domain controller 154 manages user accounts 156 including the user's log-in information for the RD session. RD system 100 also includes a connection broker 152 that manages connections between client computing device 110 and host server 160. Connection broker 152 and domain controller 154 may be, e.g., physical servers or VMs running on the same server or different servers.

In embodiments illustrated herein, RDs are running in VMs 164. VMs 164 are instantiated on host servers 160, each of host servers 160 including a software platform 162 and a hardware platform 180. Hardware platform 180 is, e.g., a server-grade x86 architecture platform including the conventional components of a computing device described above for hardware platform 132. Hardware platform 180 of each of host servers 160 is coupled to a shared persistent storage system 192.

Software platform 162 includes a hypervisor 174, which is a virtualization software layer that supports a VM execution space within which VMs 164 are concurrently instantiated and executed. One example of hypervisor 174 is a VMware ESXR hypervisor, available from VMware, Inc. VM 164-1 includes an RD agent software program 166 and an application 170. RD agent 166 and application 170 each run on a guest OS 172, which is a commodity OS.

RD agent 166 communicates with RD client 114 to establish the RD session for the user. For example, RD agent 166 transmits RD image 142 to RD client 114 to be displayed on display device 140. RD client 114 and RD agent 166 are also referred to individually and collectively herein as RD software. Application 170 consumes images created by the ICDs connected to client computing device 110. Application 170 has been modified to handle scanner redirection with scanner redirection module 120. For example, application 170 may be Adobe® Photoshop®, which the user accesses through the RD session.

Host servers 160 are managed by a virtualization manager 190. Virtualization manager 190 logically groups host servers 160 into a cluster to perform cluster-level tasks such as provisioning and managing VMs 164 and migrating VMs 164 from one of host servers 160 to another. Virtualization manager 190 communicates with host servers 160 via a management network (not shown), which is provisioned from a physical network 102 such as a local area network (LAN). Virtualization manager 190 may be, e.g., a physical server or one of VMs 164. One example of virtualization manager 190 is VMware vCenter Server®, available from VMware, Inc. A particular configuration of RD system 100 is illustrated in FIG. 1, but it should be recognized that one or more embodiments may be practiced with other computer system configurations.

Figure 2:
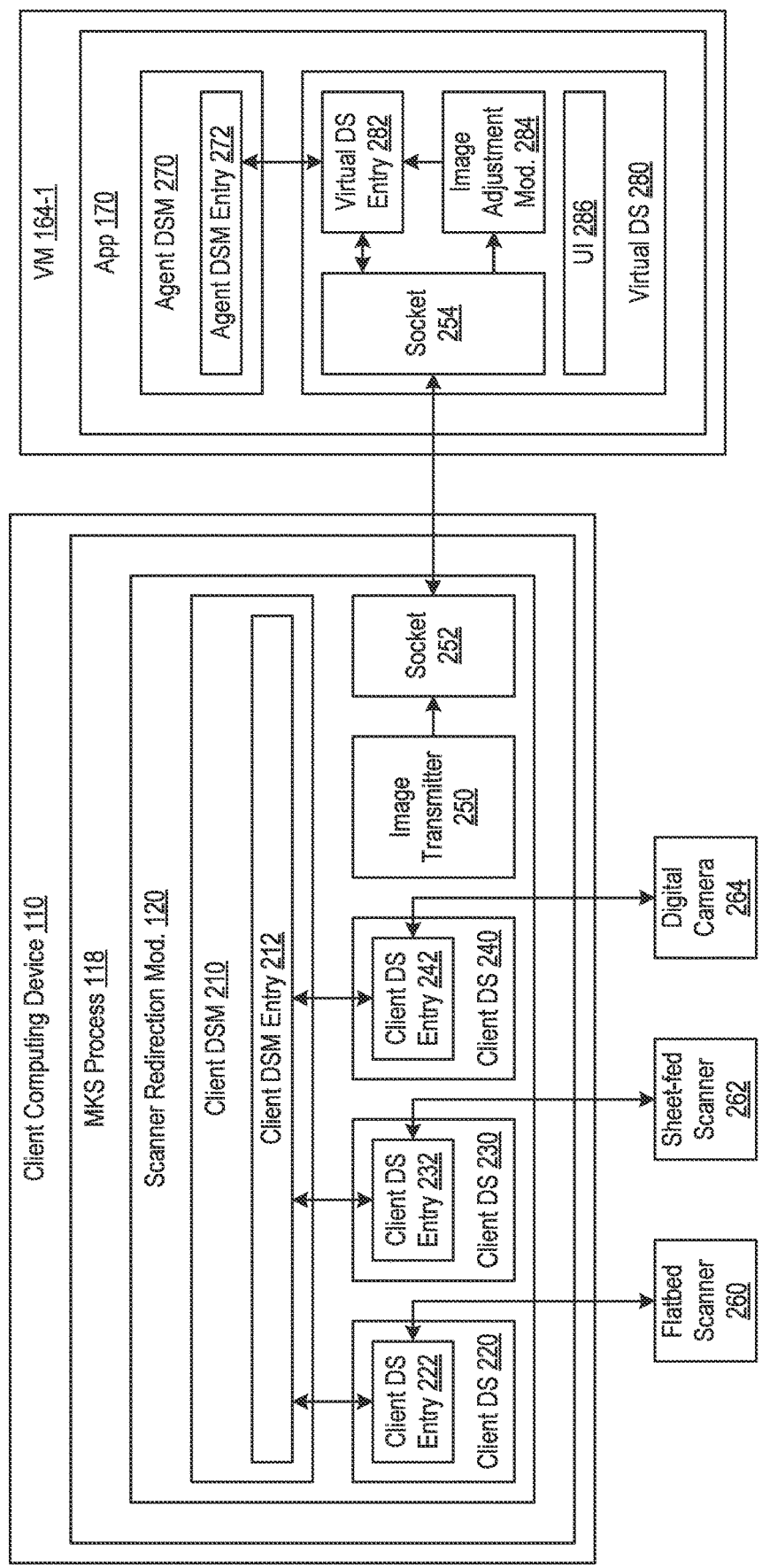
FIG. 2 is a block diagram of a client computing device and a virtual machine (VM) of the RD system, according to a first embodiment.

FIG. 2 is a block diagram of client computing device 110 and VM 164-1, according to a first embodiment. According to the first embodiment, scanner redirection module 120 and application 170 use the same scanning protocol. Additionally, according to the first embodiment, various settings of images are adjusted by software executing in VM 164-1, as discussed further below. Client computing device 110 is connected to three ICDs: a flatbed scanner 260, a sheet-fed scanner 262, and a digital camera 264.

Scanner redirection module 120 includes a client data source manager (DSM) 210 that communicates with scanner cores to acquire images. According to the first embodiment, the scanner cores are client data sources (DSs) 220, 230, and 240. Client DSs 220, 230, and 240 are configured to communicate with flatbed scanner 260, sheet-fed scanner 262, and digital camera 264, respectively. Although illustrated as communicating directly with the ICDs, client DSs 220, 230, and 240 may also communicate with the ICDs via drivers of OS 130.

To communicate with the ICDs, scanner redirection module 120 calls a "client DSM entry" function 212 to transmit commands to client DSM 210. Client DSM 210 then calls a "client DS entry" function 222, 232, or 242 to transmit commands to client DS 220, 230, or 240, respectively. The relevant client DS then returns results to client DSM 210 via return values of the client DS entry call. Similarly, client DSM 210 returns results via client DSM entry 212 return values.

Client DSs 220, 230, and 240 have UIs (not shown) for adjusting settings of ICDs and requesting images. However, the UIs are disabled to instead present the user a UI 286 of application 170, as discussed further below. When one of the client DSs acquires an image from a corresponding ICD, an image transmitter 250 transmits the image to application 170 via sockets 252 and 254 of scanner redirection module 120 and application 170, respectively.

Application 170 includes an agent DSM 270 that communicates with a virtual DS 280. Virtual DS 280 communicates with scanner redirection module 120, e.g., to request images therefrom. Specifically, application 170 calls an "agent DSM entry" function 272 to transmit commands to agent DSM 270. Agent DSM 270 then calls a "virtual DS entry" function 282 to transmit commands to virtual DS 280. Virtual DS 280 also returns results to agent DSM 270 via return values of virtual DS entry 282 calls. Similarly, agent DSM 270 returns results via agent DSM entry 272 return values.

Through UI 286, the user adjusts settings to apply effects to images to be created, and the user then requests for the images to be created. As previously mentioned, application 170 receives images from scanner redirection module 120 via sockets 252 and 254. Specifically, according to the first embodiment, the images are received by an image adjustment module 284 of virtual DS 280, which adjusts settings that are not supported by the ICDs. Virtual DS 280 then returns the images to agent DSM 270 via virtual DS entry 282. Adjustments made by image adjustment module 284 are also referred to herein as being made "by software."

Figure 3:
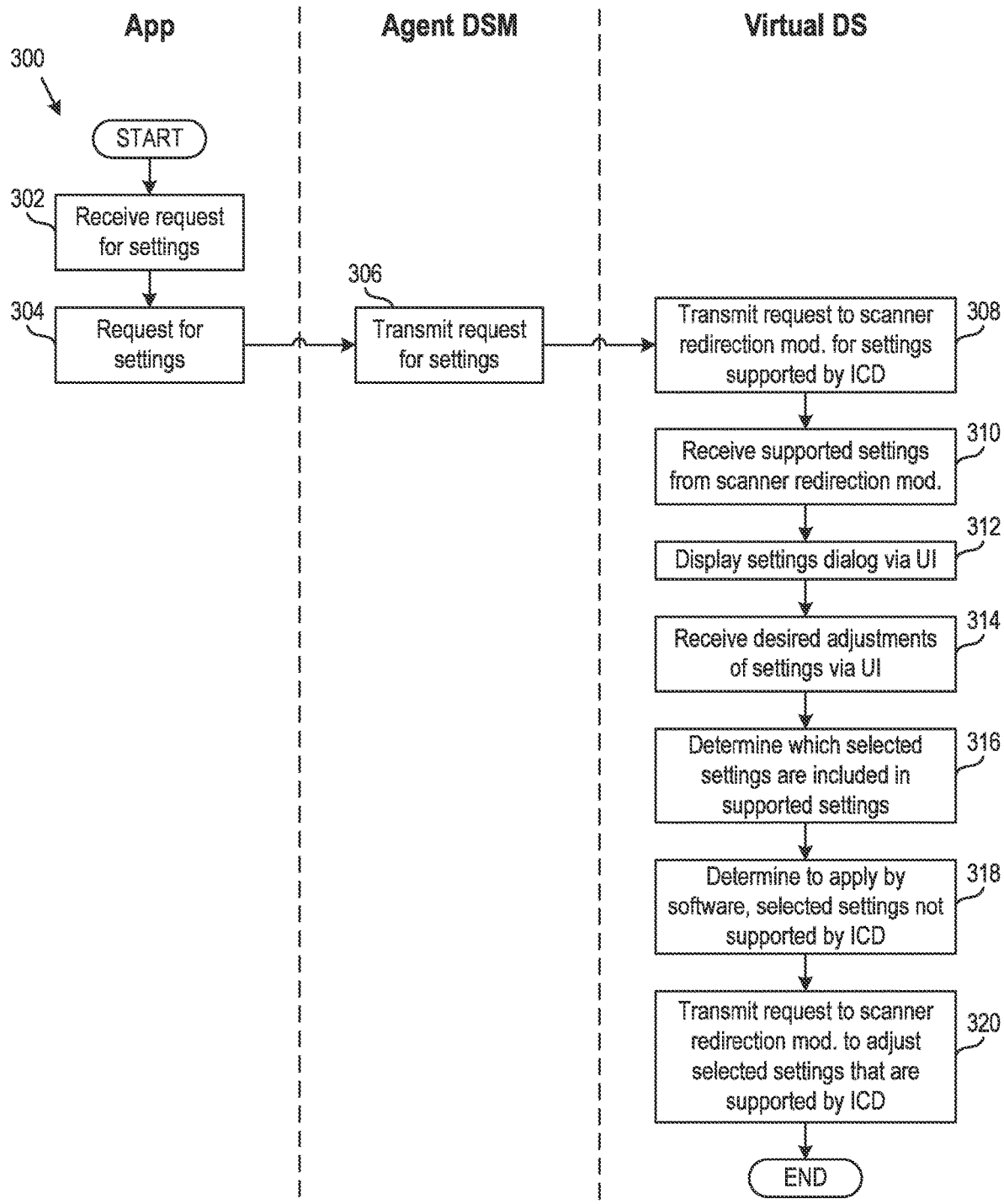
FIG. 3 is a flow diagram of a method performed by the VM to acquire settings supported by an image capturing device and to adjust selected settings, according to embodiments.

FIG. 3 is a flow diagram of a method 300 performed by VM 164-1 to acquire settings supported by an ICD and to adjust selected settings, according to embodiments in which images are adjusted by software executing in VM 164-1. Method 300 is applicable to the first embodiment and to a second embodiment (described below). At step 302, application 170 receives a request for settings that the user can adjust for an image to be created by the ICD. For example, the user may click an "acquire" button of application 170 to trigger the request. At step 304, application 170 calls agent DSM entry 272 to request agent DSM 270 for the settings. At step 306, agent DSM 270 makes a virtual DS entry 282 call to transmit a request to virtual DS 280 for the settings.

At step 308, virtual DS 280 transmits a request to scanner redirection module 120 via sockets 252 and 254 for settings that are supported by the ICD. At step 310, virtual DS 280 receives the supported settings from scanner redirection module 120 via sockets 252 and 254. At step 312, virtual DS 280 displays a settings dialog via UI 286. The settings dialog includes the supported settings received from scanner redirection module 120 at step 310. The settings dialog also includes settings that are not supported by the ICD.

At step 314, virtual DS 280 receives input from the user via UI 286, indicating desired adjustments of settings. At step 316, virtual DS 280 determines which of the selected settings to adjust are supported by the ICD, i.e., which of the selected settings were included in the supported settings received from scanner redirection module 120 at step 310. At step 318, virtual DS 280 determines to apply by software, any selected settings that are not supported by the ICD. At step 320, virtual DS 280 transmits a request to scanner redirection module 120 to adjust selected settings that are supported by the ICD. After step 320, method 300 ends.

Figure 4:
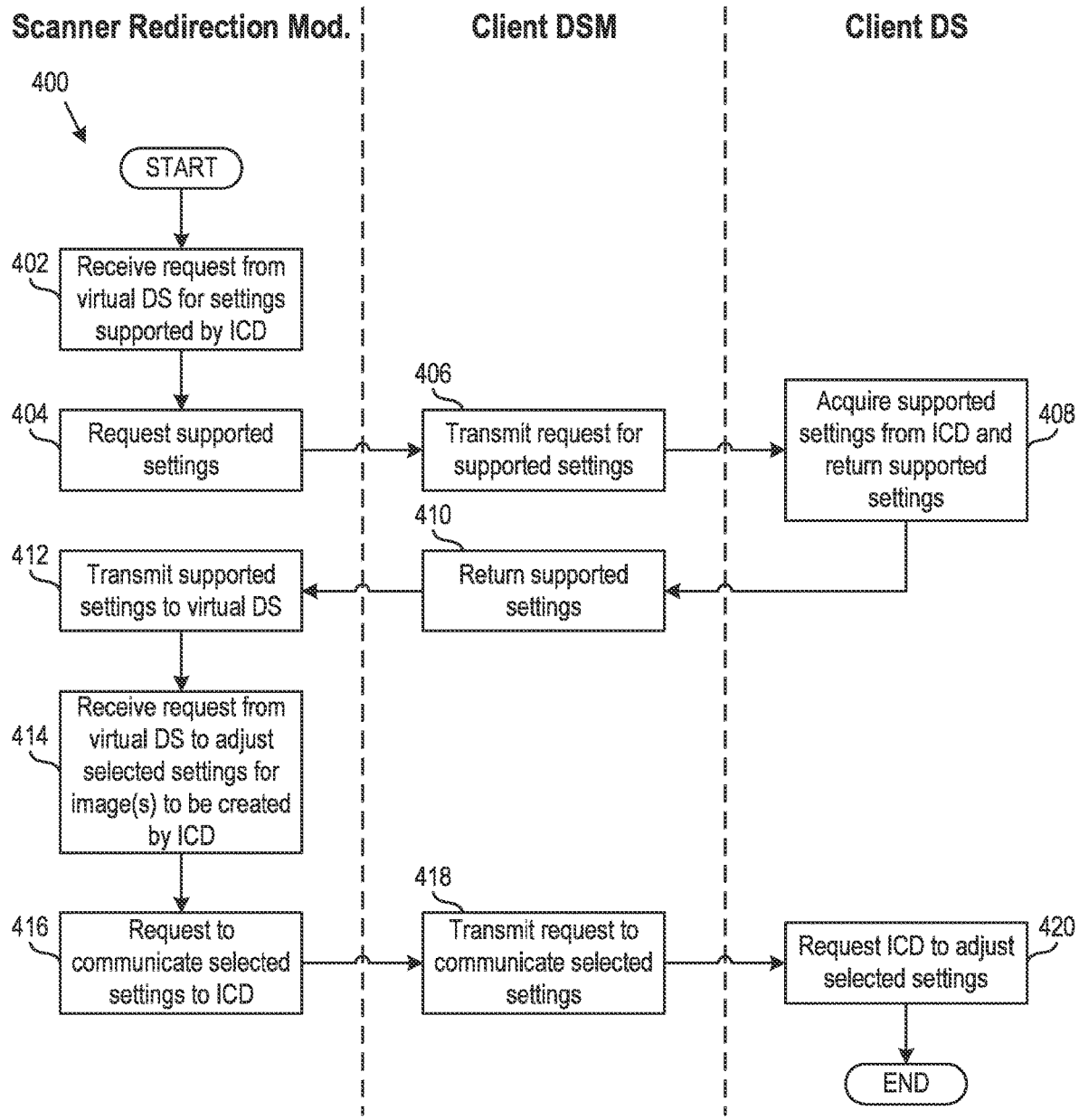
FIG. 4 is a flow diagram of a method performed by the client computing device to acquire settings supported by an image capturing device and to adjust selected settings, according to the first embodiment.

FIG. 4 is a flow diagram of a method 400 performed by client computing device 110 to acquire settings supported by an ICD and to adjust selected settings, according to the first embodiment. Method 400 will be discussed with respect to flatbed scanner 260. However, method 400 may also be used with other ICDs. At step 402, scanner redirection module 120 receives a request from virtual DS 280 via sockets 252 and 254 for settings supported by flatbed scanner 260. At step 404, scanner redirection module 120 calls client DSM entry 212 to request client DSM 210 for the supported settings. At step 406, client DSM 210 calls client DS entry 222 to transmit a request to client DS 220 for the supported settings.

At step 408, client DS 220 acquires the supported settings from flatbed scanner 260 and transmits the supported settings to client DSM 210 as a return value of the call to client DS entry 222. At step 410, client DSM 210 transmits the supported settings to scanner redirection module 120 as a return value of the call to client DSM entry 212. At step 412, scanner redirection module 120 transmits the supported settings to virtual DS 280 via sockets 252 and 254. At step 414, scanner redirection module 120 receives a request from virtual DS 280 to adjust selected settings for one or more images to be created by flatbed scanner 260. The selected settings received at step 414 are all supported by flatbed scanner 260.

At step 416, scanner redirection module 120 calls client DSM entry 212 to request client DSM 210 to communicate the selected settings to flatbed scanner 260. At step 418, client DSM 210 calls client DS entry 222 to transmit a request to client DS 220 to communicate the selected settings to flatbed scanner 260. At step 420, client DS 220 transmits a request to flatbed scanner 260 to adjust the selected settings. After step 420, method 400 ends Scanner redirection module 120 may receive additional requests to adjust selected settings, at which point steps 414-420 are repeated for the additional requests.

Figure 5:
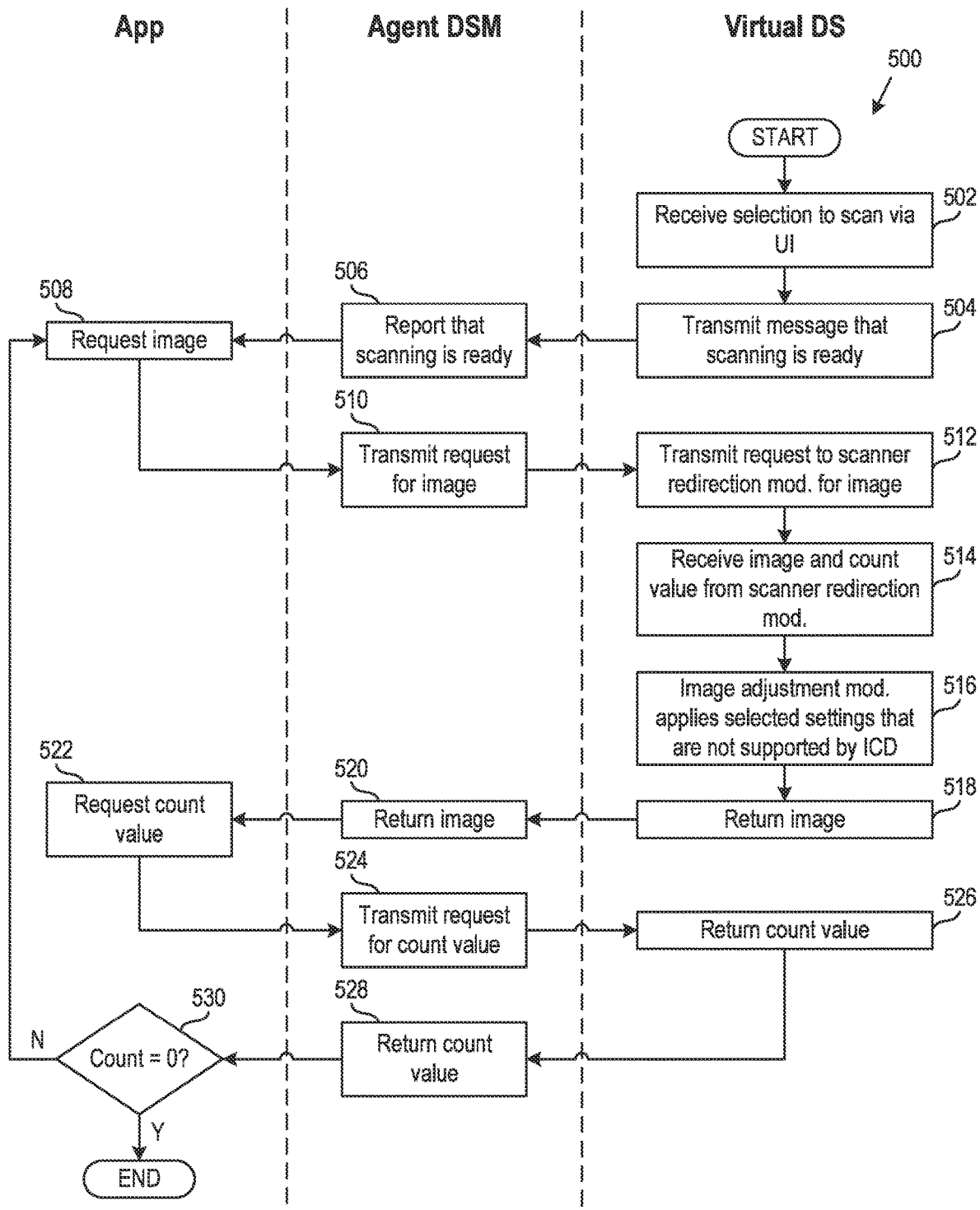
FIG. 5 is a flow diagram of a method performed by the VM to acquire an image from an image capturing device, according to embodiments.

FIG. 5 is a flow diagram of a method 500 performed by VM 164-1 to acquire an image from an ICD, according to embodiments in which images are adjusted by software executing in VM 164-1. Method 500 is applicable to the first embodiment and to the second embodiment (described below). At step 502, virtual DS 280 receives a selection via UI 286 to scan an image. For example, the user may click a "scan" button of UI 286 to trigger the request. At step 504, virtual DS 280 transmits a message to agent DSM 270 indicating that scanning is ready. At step 506, agent DSM 270 reports to application 170 that scanning is ready. At step 508, application 170 calls agent DSM entry 272 to request an image from agent DSM 270.

At step 510, agent DSM 270 calls virtual DS entry 282 to transmit a request to virtual DS 280 for the image. At step 512, virtual DS 280 transmits a request for the image to scanner redirection module 120 via sockets 252 and 254. At step 514, virtual DS 280 receives the image and a "count" value from scanner redirection module 120 via sockets 252 and 254. Count is a variable indicating whether there are any pending images yet to be retrieved from an ICD. A count value of zero indicates that there are no pending images, while a nonzero count value indicates that there is at least one pending image.

At step 516, image adjustment module 284 applies to the image, selected settings that are not supported by the ICD. For example, image adjustment module 284 may change the orientation of the image, rotate the image, and adjust the brightness, contrast, and gamma of the image. At step 518, virtual DS 280 transmits the image to agent DSM 270 as a return value of the call to virtual DS entry 282. At step 520, agent DSM 270 transmits the image to application 170 as a return value of the call to agent DSM entry 272. At step 522, application 170 calls agent DSM entry 272 to request agent DSM 270 for the count value.

At step 524, agent DSM 270 calls virtual DS entry 282 to transmit a request to virtual DS 280 for the count value. At step 526, virtual DS 280 transmits the count value to agent DSM 270 as a return value of the call to virtual DS entry 282. At step 528, agent DSM 270 transmits the count value to application 170 as a return value of the call to agent DSM entry 272. At step 530, application 170 checks if the count value is zero. If the count value is nonzero, method 500 returns to step 508, and application 170 calls agent DSM entry 272 to request another image from agent DSM 270. Otherwise, if the count value is zero, method 500 ends.

Figure 6:
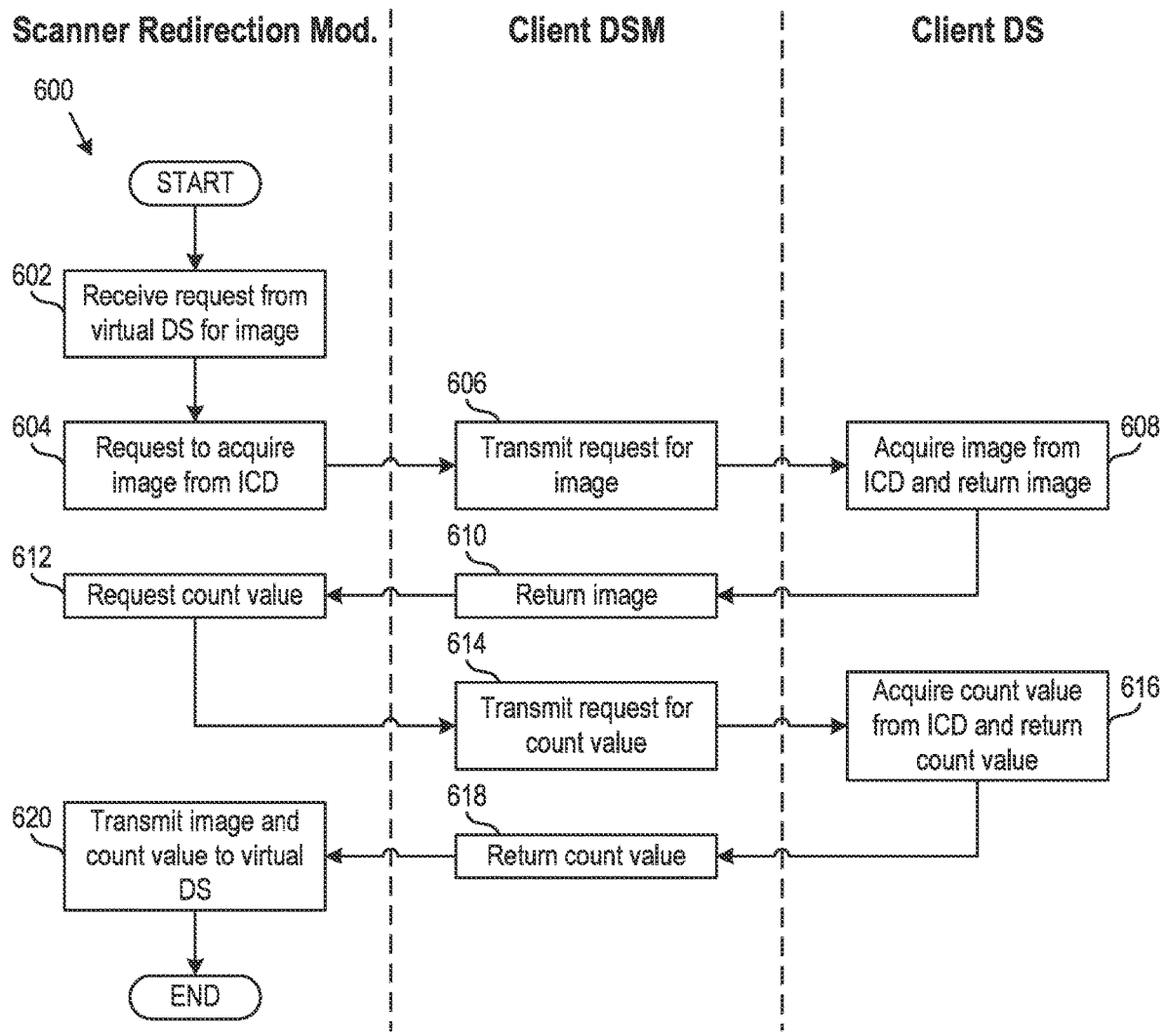
FIG. 6 is a flow diagram of a method performed by the client computing device to acquire an image from an image capturing device, according to the first embodiment.

FIG. 6 is a flow diagram of a method 600 performed by client computing device 110 to acquire an image from an ICD, according to the first embodiment. Method 600 will be discussed with respect to flatbed scanner 260. However, method 600 may also be used with other ICDs. At step 602, scanner redirection module 120 receives a request for an image, from virtual DS 280 via sockets 252 and 254. At step 604, scanner redirection module 120 calls client DSM entry 212 to request client DSM 210 to acquire an image from flatbed scanner 260.

At step 606, client DSM 210 calls client DS entry 222 to transmit a request to client DS 220 for the image. At step 608, client DS 220 acquires the image from flatbed scanner 260 and transmits the image to client DSM 210 as a return value of the call to client DS entry 222. At step 610, client DSM 210 transmits the image to scanner redirection module 120 as a return value of the call to client DSM entry 212. At step 612, scanner redirection module 120 calls client DSM entry 212 to request client DSM 210 for a count value.

At step 614, client DSM 210 calls client DS entry 222 to transmit a request to client DS 220 for the count value. At step 616, client DS 220 acquires the count value from flatbed scanner 260 and transmits the count value to client DSM 210 as a return value of the call to client DS entry 222. At step 618, client DSM 210 transmits the count value to scanner redirection module 120 as a return value of the call to client DSM entry 212. At step 620, scanner redirection module 120 transmits the image and count value to virtual DS 280 via sockets 252 and 254. After step 620, method 600 ends.

Figure 7:
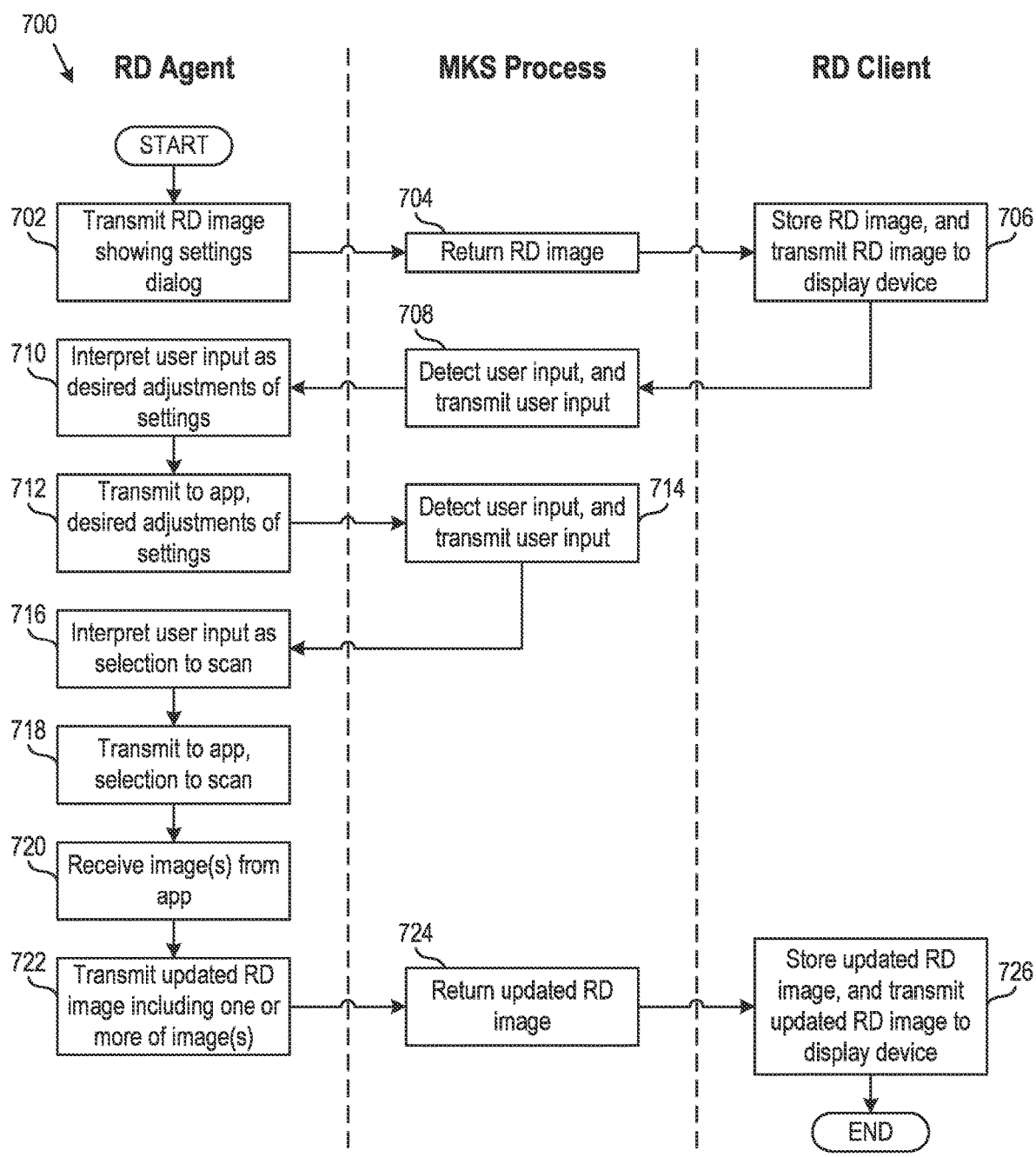
FIG. 7 is a flow diagram of a method performed by the client computing device and the VM to carry out an RD session including user input and display output, according to embodiments.

FIG. 7 is a flow diagram of a method 700 performed by client computing device 110 and VM 164-1 to carry out the RD session including user input and display output, according to embodiments. Method 700 is applicable to the first embodiment and to each of the other embodiments described later. Method 700 will be discussed with respect to flatbed scanner 260. However, method 700 may also be used with other ICDs. At step 702, RD agent 166 transmits RD image 142 to MKS process 118. RD image 142 illustrates the settings dialog of UI 286. The settings dialog includes settings that the user can adjust, including settings that are supported by flatbed scanner 260 and settings that are not supported thereby.

At step 704, MKS process 118 returns RD image 142 to RD client 114. At step 706, RD client 114 stores RD image 142, e.g., in the memory of hardware platform 132. RD client 114 also transmits RD image 142 to display device 140 to be displayed to the user. At step 708, MKS process 118 detects user input and transmits the user input to RD agent 166. For example, the user may make the input by clicking a mouse or typing on a keyboard. At step 710, RD agent 166 interprets the user input as desired adjustments of settings. At step 712, RD agent 166 transmits to application 170, the desired adjustments of settings. For those desired adjustments that are to settings supported by flatbed scanner 260, the desired adjustments are communicated to flatbed scanner 260. The other desired adjustments will be made to images through software.

At step 714, MKS process 118 detects additional user input and transmits the additional user input to RD agent 166. For example, the user may again make the input though the mouse or keyboard. At step 716, RD agent 166 interprets the additional user input as the user selecting to scan one or more images. At step 718, RD agent 166 transmits to application 170, the user's selection to scan. That selection is communicated to flatbed scanner 260, which creates one or more images for application 170. Some of the desired adjustments of settings are applied to the image(s) by flatbed scanner 260, and others are applied by software, i.e., by image adjustment module 284.

At step 720, RD agent 166 receives the image(s) from application 170. At step 722, RD agent 166 transmits an updated RD image 142 to MKS process 118, RD image 142 now illustrating one or more of the image(s). At step 724, MKS process 118 returns RD image 142 to RD client 114. At step 726, RD client 114 stores RD image 142 including the one or more of the image(s), e.g., in the memory of hardware platform 132. RD client 114 also transmits RD image 142 to display device 140 to be displayed to the user. After step 726, method 700 ends.

Figure 8:
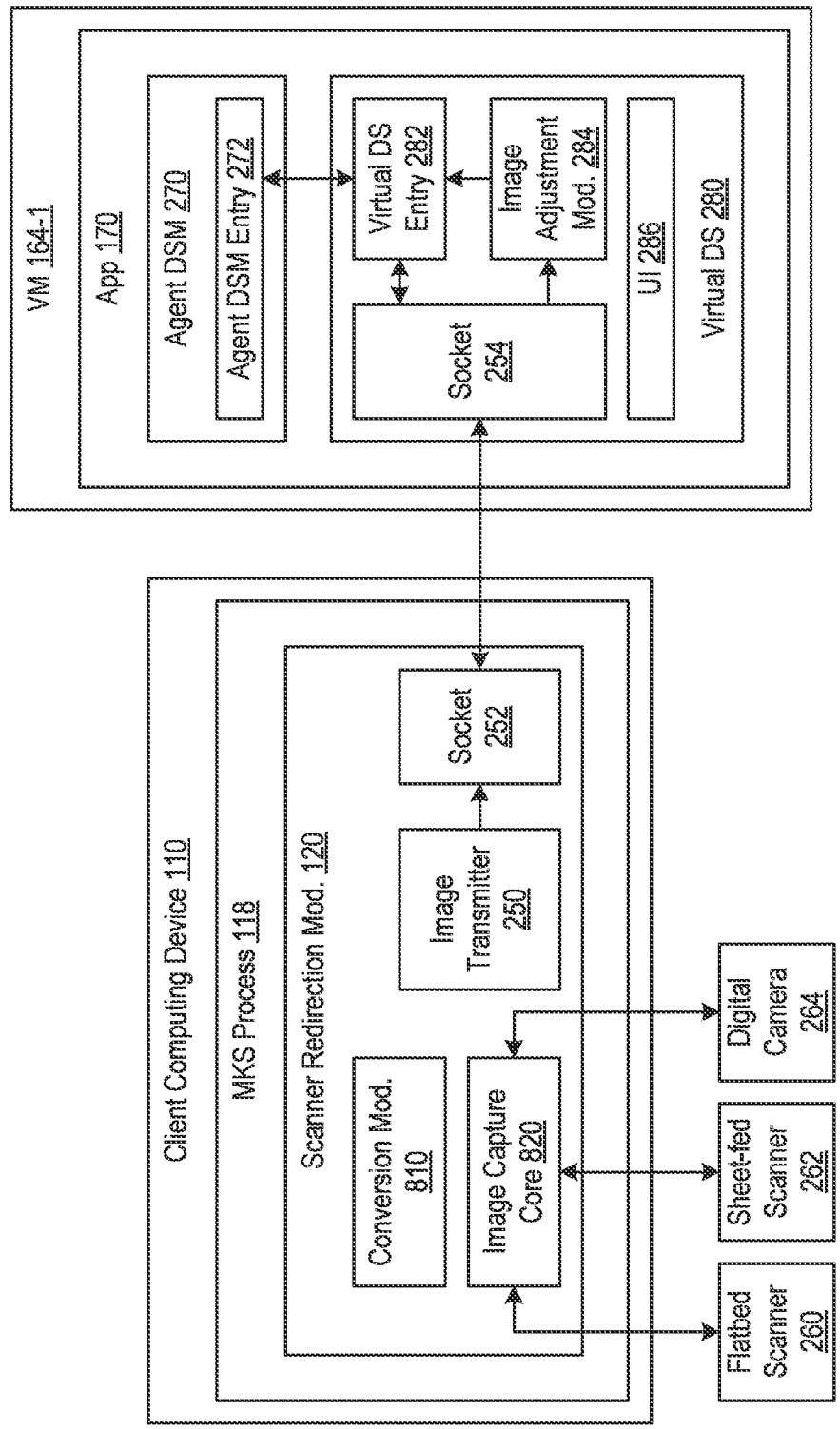
FIG. 8 is a block diagram of the client computing device and the VM according to a second embodiment.

FIG. 8 is a block diagram of client computing device 110 and VM 164-1 according to the second embodiment. According to the second embodiment, scanner redirection module 120 and application 170 use different scanning protocols. However, like the first embodiment, various settings of images are adjusted by software executing in VM 164-1. Items of FIG. 8 that are common with those of FIG. 2 have the same numbers and will not be explained again.

Like the first embodiment, scanner redirection module 120 includes a scanner core that communicates with flatbed scanner 260, sheet-fed scanner 262, and digital camera 264 to acquire images therefrom. However, according to the second embodiment, the scanner core is an image capture core 820. Although illustrated as communicating directly with the ICDs, image capture core 820 may also communicate with the ICDs via drivers of OS 130. When image capture core 820 acquires an image from an ICD, image transmitter 250 transmits the image to application 170 via sockets 252 and 254. Communication between scanner redirection module 120 and individual components thereof and communication between the individual components, are facilitated via API calls.

Because scanner redirection module 120 and application 170 use different scanning protocols, scanner redirection module 120 includes a conversion module 810. Conversion module 810 converts data between the different scanning protocols. For example, if virtual DS 280 requests to acquire settings, conversion module 810 converts the settings to the scanning protocol of application 170 before image transmitter 250 transmits them to virtual DS 280. If virtual DS 280 transmits selected settings to adjust to scanner redirection module 120, conversion module 810 converts the selected settings to the scanning protocol of scanner redirection module 120 to be understood by image capture core 820.

Figure 9:
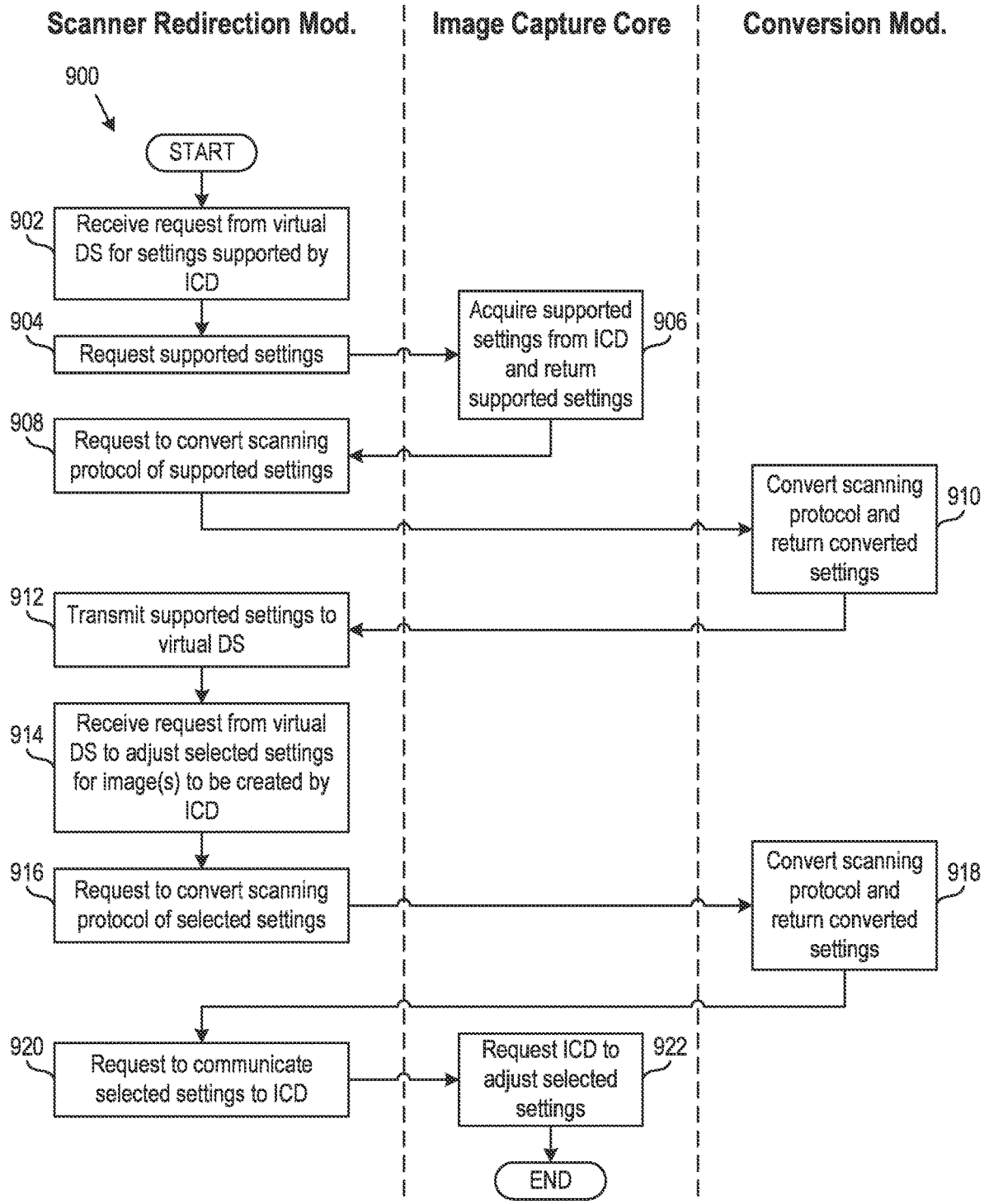
FIG. 9 is a flow diagram of a method performed by the client computing device to acquire settings supported by an image capturing device and to adjust selected settings, according to the second embodiment.

FIG. 9 is a flow diagram of a method 900 performed by client computing device 110 to acquire settings supported by an ICD and to adjust selected settings, according to the second embodiment. Method 900 will be discussed with reference to flatbed scanner 260. However, method 900 may also be used with other ICDs. At step 902, scanner redirection module 120 receives a request from virtual DS 280 via sockets 252 and 254 for settings supported by flatbed scanner 260. At step 904, scanner redirection module 120 makes an API call to image capture core 820 to request image capture core 820 for the supported settings.

At step 906, image capture core 820 acquires the supported settings from flatbed scanner 260 and returns the supported settings to scanner redirection module 120. The supported settings are described according to the scanning protocol of scanner redirection module 120. At step 908, scanner redirection module 120 makes an API call to conversion module 810 to request conversion module 810 to convert the supported settings from being described according to the scanning protocol of scanner redirection module 120, to being described according to the scanning protocol of application 170. At step 910, conversion module 810 converts the supported settings to the scanning protocol of application 170. For example, if the scanning protocol of application 170 is TWAIN, conversion module 810 converts the supported settings to TWAIN capabilities. Conversion module 810 then returns the converted settings to scanner redirection module 120.

At step 912, scanner redirection module 120 transmits the supported settings from conversion module 810, to virtual DS 280 via sockets 252 and 254. At step 914, scanner redirection module 120 receives a request from virtual DS 280 to adjust selected settings for one or more images to be created by flatbed scanner 260. The selected settings received at step 914 are all supported flatbed scanner 260. The desired adjustment is described according to the scanning protocol of application 170. At step 916, scanner redirection module 120 makes an API call to conversion module 810 to request conversion module 810 to convert the selected settings from being described according to the scanning protocol of application 170, to being described according to the scanning protocol of scanner redirection module 120.

At step 918, conversion module 810 converts the selected settings to the scanning protocol of scanner redirection module 120 and returns the converted settings to scanner redirection module 120. For example, if the scanning protocol of scanner redirection module 120 is the ICA framework, conversion module 810 converts the selected settings to the ICA framework. At step 920, scanner redirection module 120 makes an API call to image capture core 820 to request image capture core 820 to communicate the selected settings from conversion module 810, to flatbed scanner 260. At step 922, image capture core 820 transmits a request to flatbed scanner 260 to adjust the selected settings. After step 922, method 900 ends. Scanner redirection module 120 may receive additional requests to adjust settings, at which point steps 914-922 are repeated for the additional requests.

Figure 10:
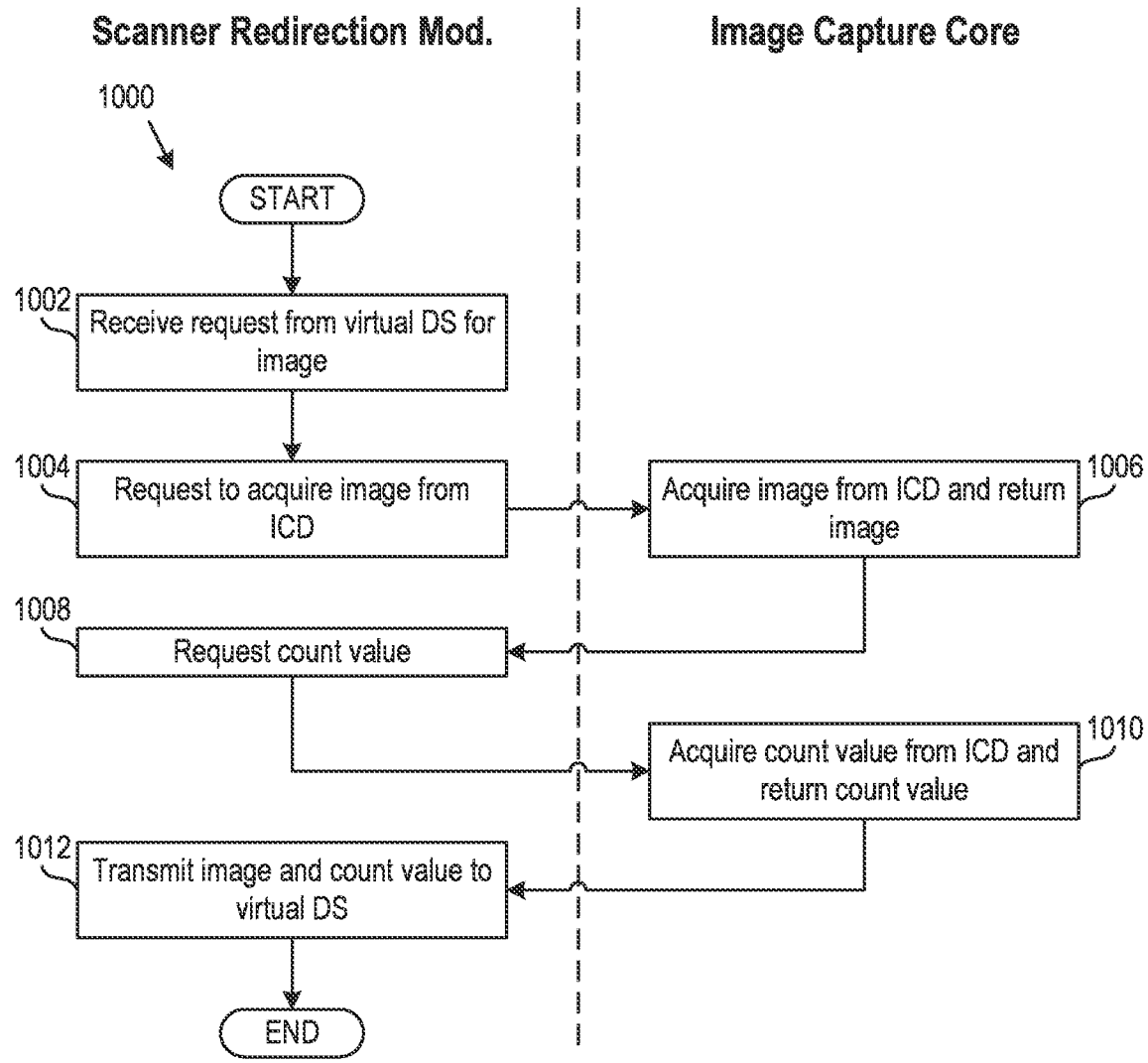
FIG. 10 is a flow diagram of a method performed by the client computing device to acquire an image from an image capturing device, according to the second embodiment.

FIG. 10 is a flow diagram of a method 1000 performed by client computing device 110 to acquire an image from an ICD, according to the second embodiment. Method 1000 will be discussed with respect to flatbed scanner 260. However, method 1000 may also be used with other ICDs. At step 1002, scanner redirection module 120 receives a request for an image, from virtual DS 280 via sockets 252 and 254. At step 1004, scanner redirection module 120 makes an API call to image capture core 820 to request image capture core 820 to acquire the image from flatbed scanner 260. At step 1006, image capture core 820 acquires the image from flatbed scanner 260 and returns the image to scanner redirection module 120.

At step 1008, scanner redirection module 120 makes an API call to image capture core 820 to request image capture core 820 for a count value. At step 1010, image capture core 820 acquires the count value from flatbed scanner 260 and returns the count value to scanner redirection module 120. At step 1012, scanner redirection module 120 transmits the image and count value to virtual DS 280 via sockets 252 and 254. After step 1012, method 1000 ends. It should be noted that image capture core 820 acquires images from flatbed scanner 260 asynchronously. For example, image capture core 820 may acquire multiple images and return them all before scanner redirection module 120 requests the count value at step 1008.

Figure 11:
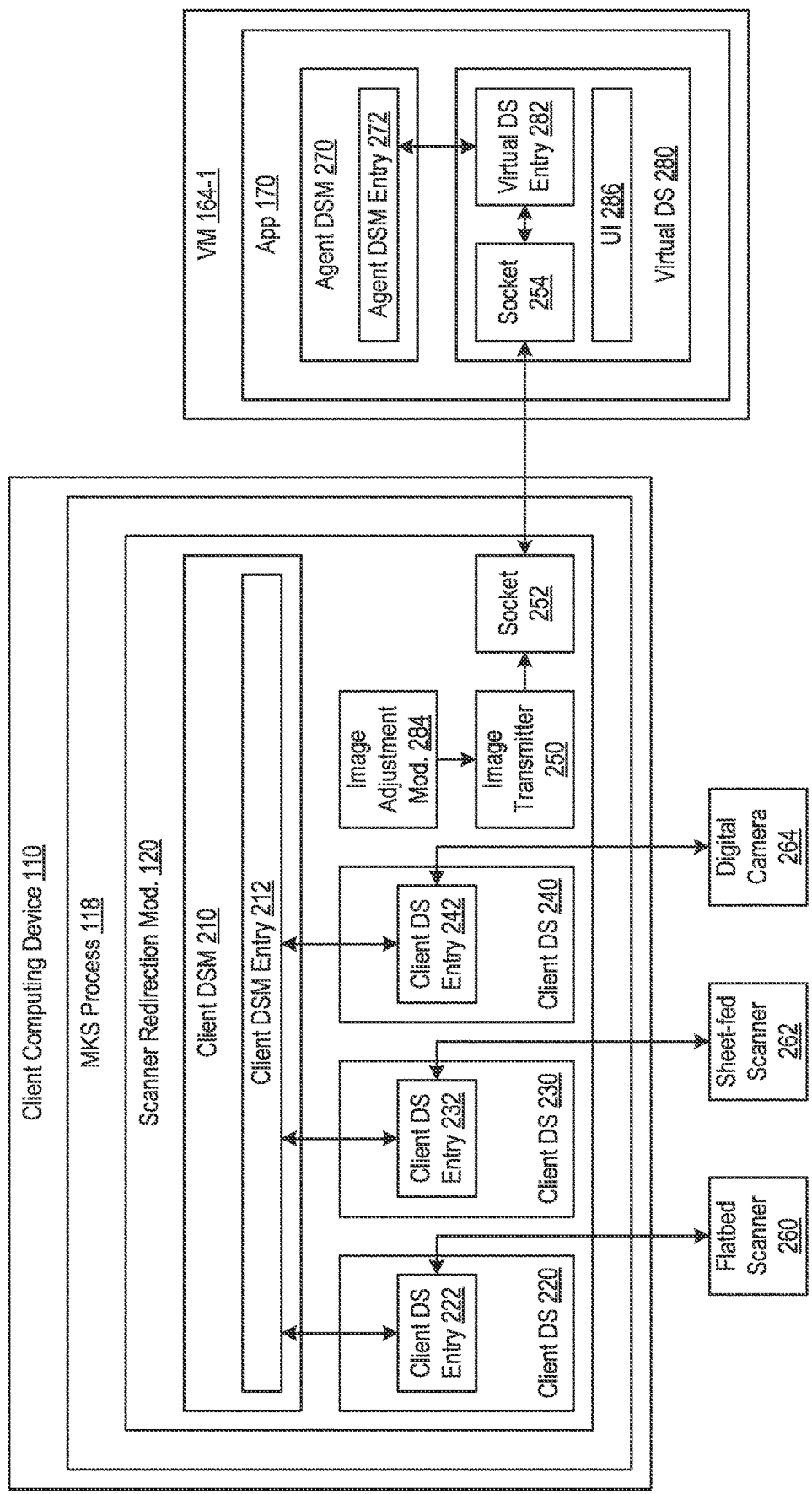
FIG. 11 is a block diagram of the client computing device and the VM according to a third embodiment.

FIG. 11 is a block diagram of client computing device 110 and VM 164-1 according to a third embodiment. According to the third embodiment, scanner redirection module 120 and application 170 use the same scanning protocol. Unlike the first and second embodiments, various settings of images are adjusted by software executing in client computing device 110, not in VM 164-1. Items of FIG. 11 that are common with those of FIG. 2 have the same numbers and will not be explained again.

When one of the client DSs of scanner redirection module 120 acquires an image from an ICD, image adjustment module 284 adjusts settings that are not supported by the ICD. Then, image transmitter 250 transmits the image to application 170 via sockets 252 and 254. Accordingly, when the image is received by virtual DS 280, all the desired settings have been applied, including those supported by the ICD and those that are not. Virtual DS 280 returns the image to agent DSM 270 via virtual DS entry 282.

Figure 12:
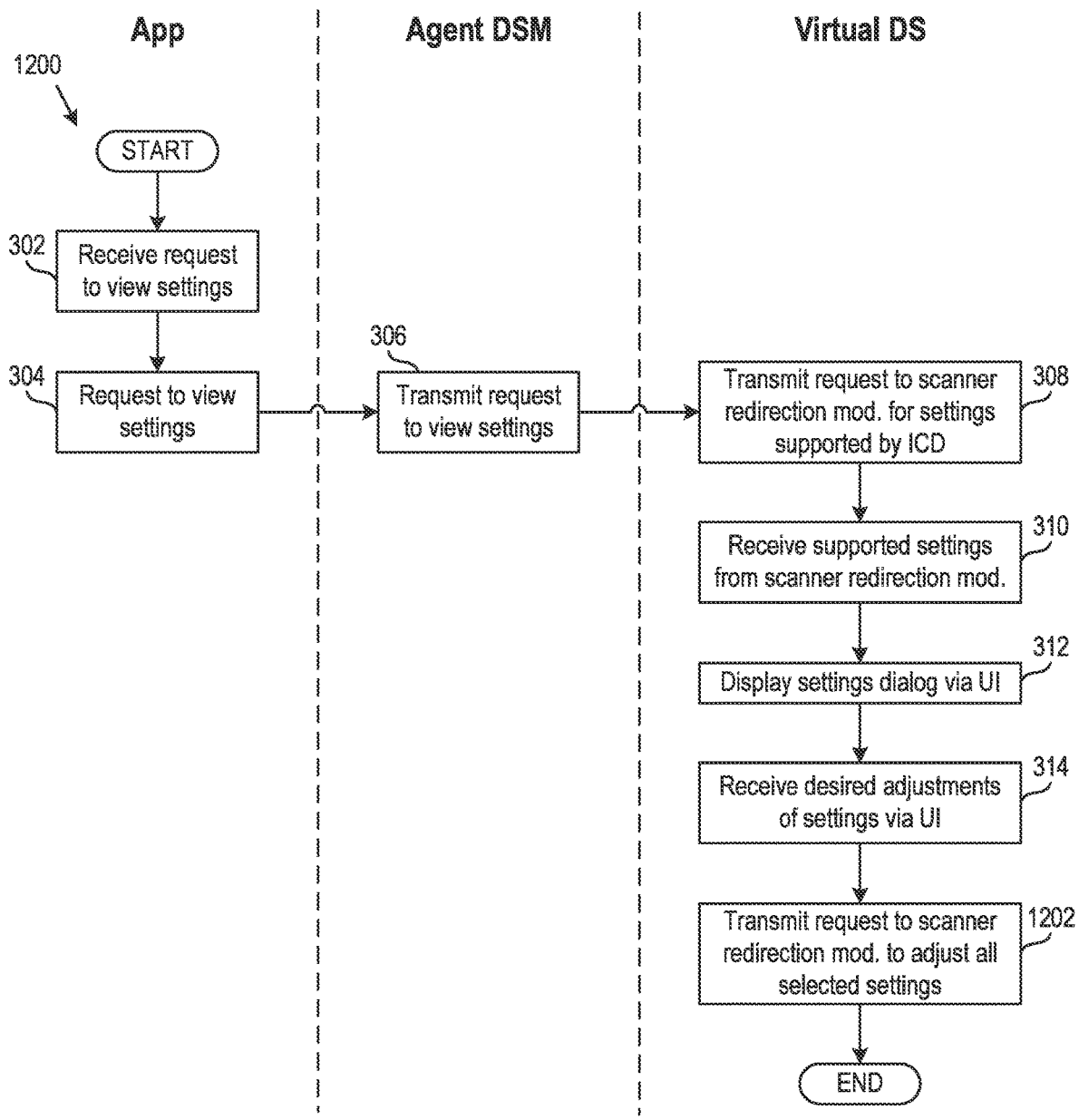
FIG. 12 is a flow diagram of a method performed by the VM to acquire settings supported by an image capturing device and to adjust selected settings, according to embodiments.

FIG. 12 is a flow diagram of a method 1200 performed by VM 164-1 to acquire settings supported by an ICD and to adjust selected settings, according to embodiments in which images are adjusted by software executing in client computing device 110. Method 1200 is applicable to the third embodiment and to a fourth embodiment (described below). Items of FIG. 12 that are common with FIG. 3 have the same numbers and will not be explained again. After step 314, when virtual DS 280 receives input from the user indicating desired adjustments of settings, method 1200 moves to step 1202. At step 1202, virtual DS 280 transmits to scanner redirection module 120, all the selected settings, i.e., not just those that are supported by the ICD. This is because it is client computing device 110 that determines which selected settings are supported by the ICD and which are not. After step 1202, method 1200 ends.

Figure 13:
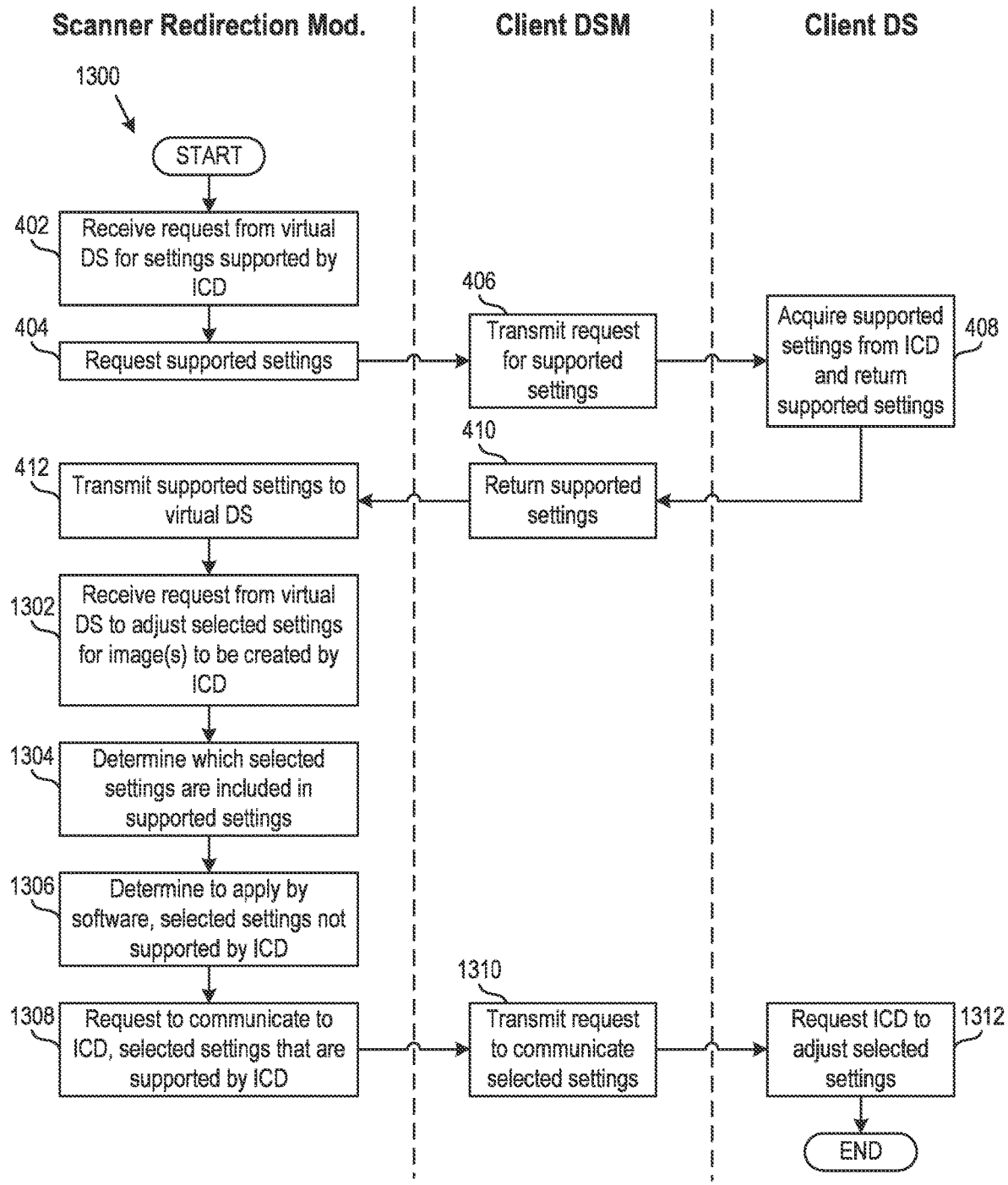
FIG. 13 is a flow diagram of a method performed by the client computing device to acquire settings supported by an image capturing device and to adjust selected settings, according to the third embodiment.

FIG. 13 is a flow diagram of a method 1300 performed by client computing device 110 to acquire settings supported by an ICD and to adjust selected settings, according to the third embodiment. Method 1300 will be discussed with respect to flatbed scanner 260. However, method 1300 may also be used with other ICDs Items of FIG. 13 that are common with FIG. 4 have the same numbers and will not be explained again.

After step 412, when scanner redirection module 120 transmits supported settings to virtual DS 280, method 1300 moves to step 1302. At step 1302, scanner redirection module 120 receives a request from virtual DS 280 to adjust selected settings for one or more images to be created by flatbed scanner 260. Some of the selected settings received at step 1302 are supported by flatbed scanner 260, while others are not. At step 1304, scanner redirection module 120 determines which of the selected settings to adjust are supported by flatbed scanner 260, i.e., which of the selected settings were included in supported settings returned by client DSM 210 at step 410.

At step 1306, scanner redirection module 120 determines to apply by software, any selected settings that are not supported by flatbed scanner 260. At step 1308, scanner redirection module 120 calls client DSM entry 212 to request client DSM 210 to communicate to flatbed scanner 260, all of the selected settings that are supported by flatbed scanner 260. At step 1310, client DSM 210 calls client DS entry 222 to transmit a request to client DS 220 to communicate the selected settings to flatbed scanner 260. At step 1312, client DS 220 transmits a request to flatbed scanner 260 to adjust the selected settings. After step 1312, method 1300 ends. Scanner redirection module 120 may receive additional requests to adjust selected settings, at which point steps 1302-1312 are repeated for the additional requests.

Figure 14:
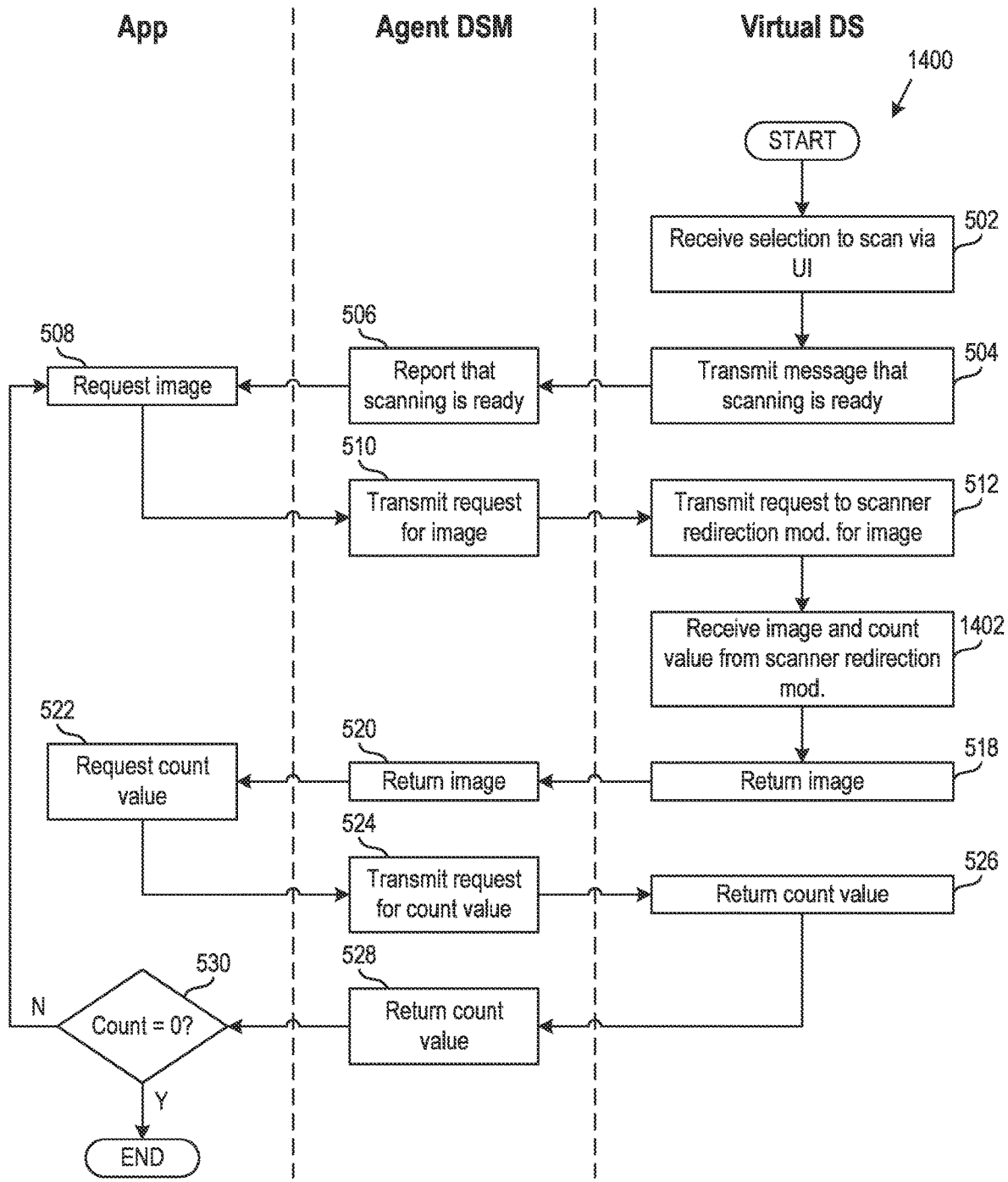
FIG. 14 is a flow diagram of a method performed by the VM to acquire an image from an image capturing device, according to embodiments.

FIG. 14 is a flow diagram of a method 1400 performed by VM 164-1 to acquire an image from an ICD, according to embodiments in which images are adjusted through software executing in client computing device 110. Method 1400 is applicable to the third embodiment and to the fourth embodiment (described below). Items of FIG. 14 that are common with Figure S have the same numbers and will not be explained again. After step 512, when virtual DS 280 transmits a request for an image to scanner redirection module 120, method 1400 moves to step 1402. At step 1402, virtual DS 280 receives the image and a count value from scanner redirection module 120 via sockets 252 and 254. The image received at step 1402 has already been adjusted by software executing in client computing device 110 to apply settings that are not supported by the ICD. The remainder of method 1400 is common with method 500 of FIG. 5 and will not be explained again.

Figure 15:
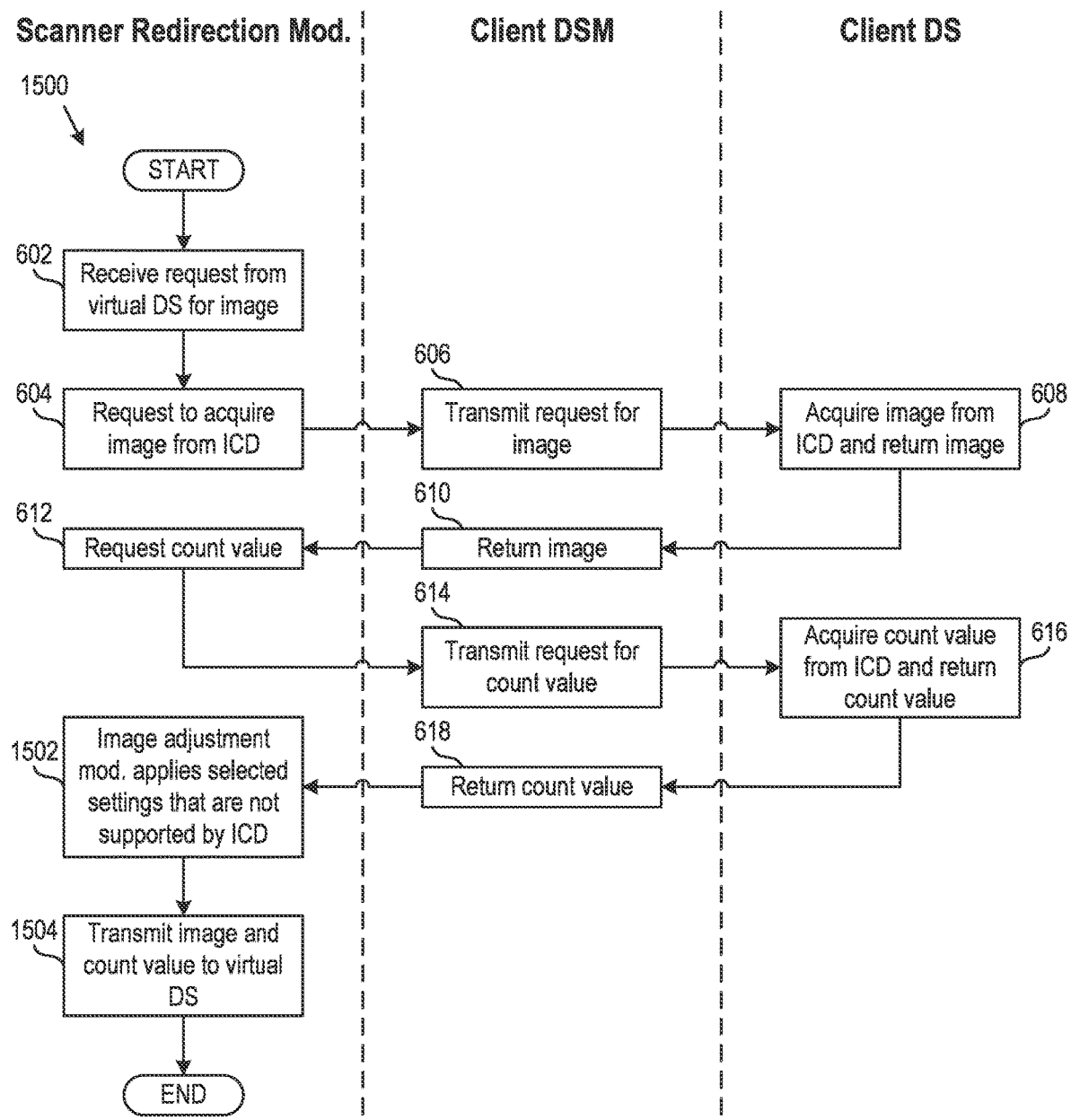
FIG. 15 is a flow diagram of a method performed by the client computing device to acquire an image from an image capturing device, according to the third embodiment.

FIG. 15 is a flow diagram of a method 1500 performed by client computing device 110 to acquire an image from an ICD, according to the third embodiment. Method 1500 will be discussed with respect to flatbed scanner 260. However, method 1500 may also be used with other ICDs. Items of FIG. 15 that are common with FIG. 6 have the same numbers and will not be explained again.

After step 618, when client DSM 210 transmits a count value to scanner redirection module 120 as a return value of a call to client DSM entry 212, method 1500 moves to step 1502. At step 1502, image adjustment module 284 applies to the image, selected settings that are not supported by flatbed scanner 260. At step 1504, scanner redirection module 120 transmits the image and count value to virtual DS 280 via sockets 252 and 254. After step 1504, method 1500 ends.

Figure 16:
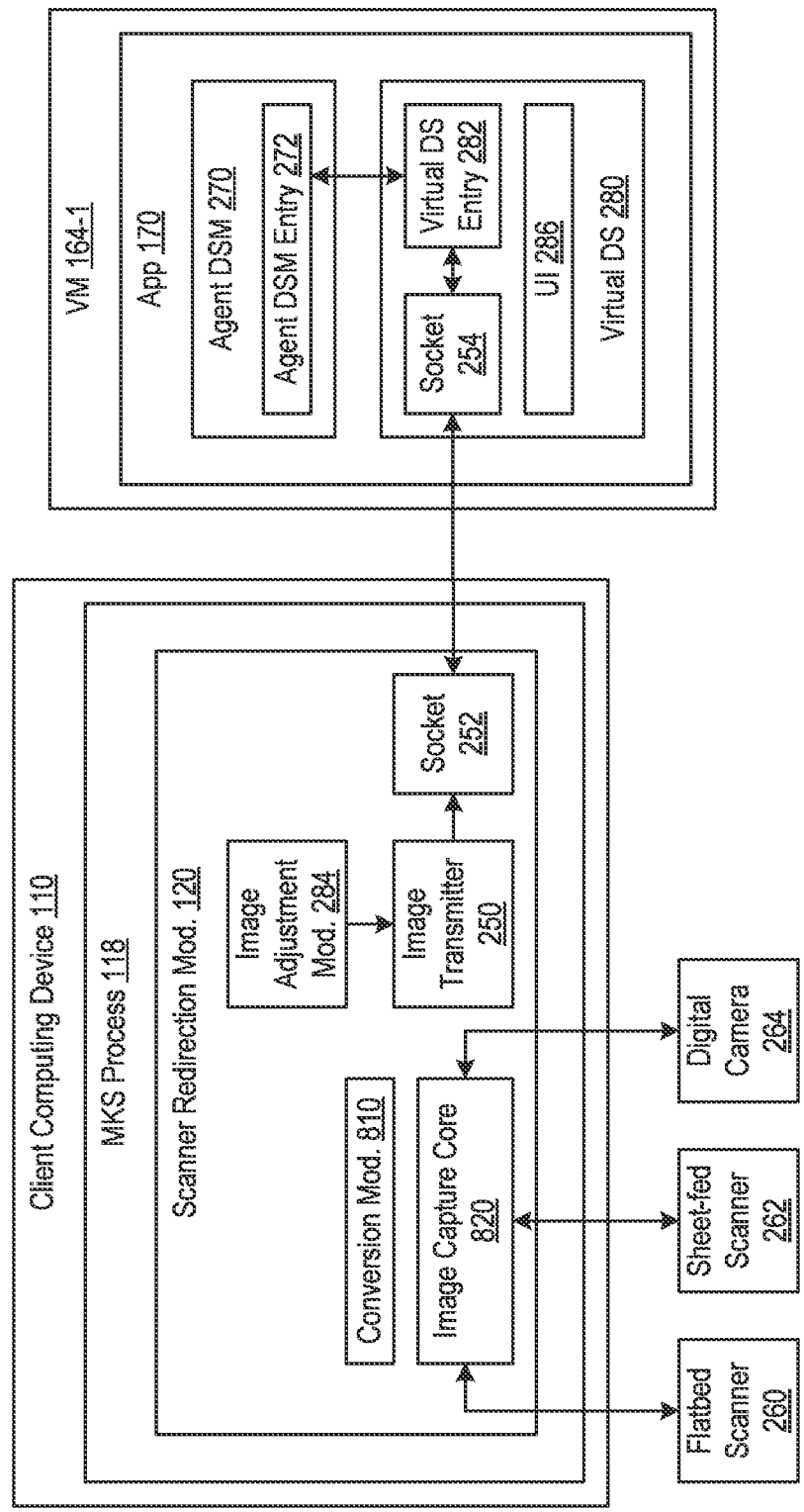
FIG. 16 is a block diagram of the client computing device and the VM according to a fourth embodiment.

FIG. 16 is a block diagram of client computing device 110 and VM 164-1 according to the fourth embodiment. According to the fourth embodiment, scanner redirection module 120 and application 170 use different scanning protocols. However, like the third embodiment, various settings of images are adjusted by software executing in client computing device 110. Items of FIG. 16 that are common with those of FIG. 8 have the same numbers and will not be explained again. When image capture core 820 acquires an image from an ICD, image adjustment module 284 adjusts settings that are not supported by the ICD. Then, image transmitter 250 transmits the image to application 170 via sockets 252 and 254. Virtual DS 280 returns the image to agent DSM 270 via virtual DS entry 282.

Figure 17:
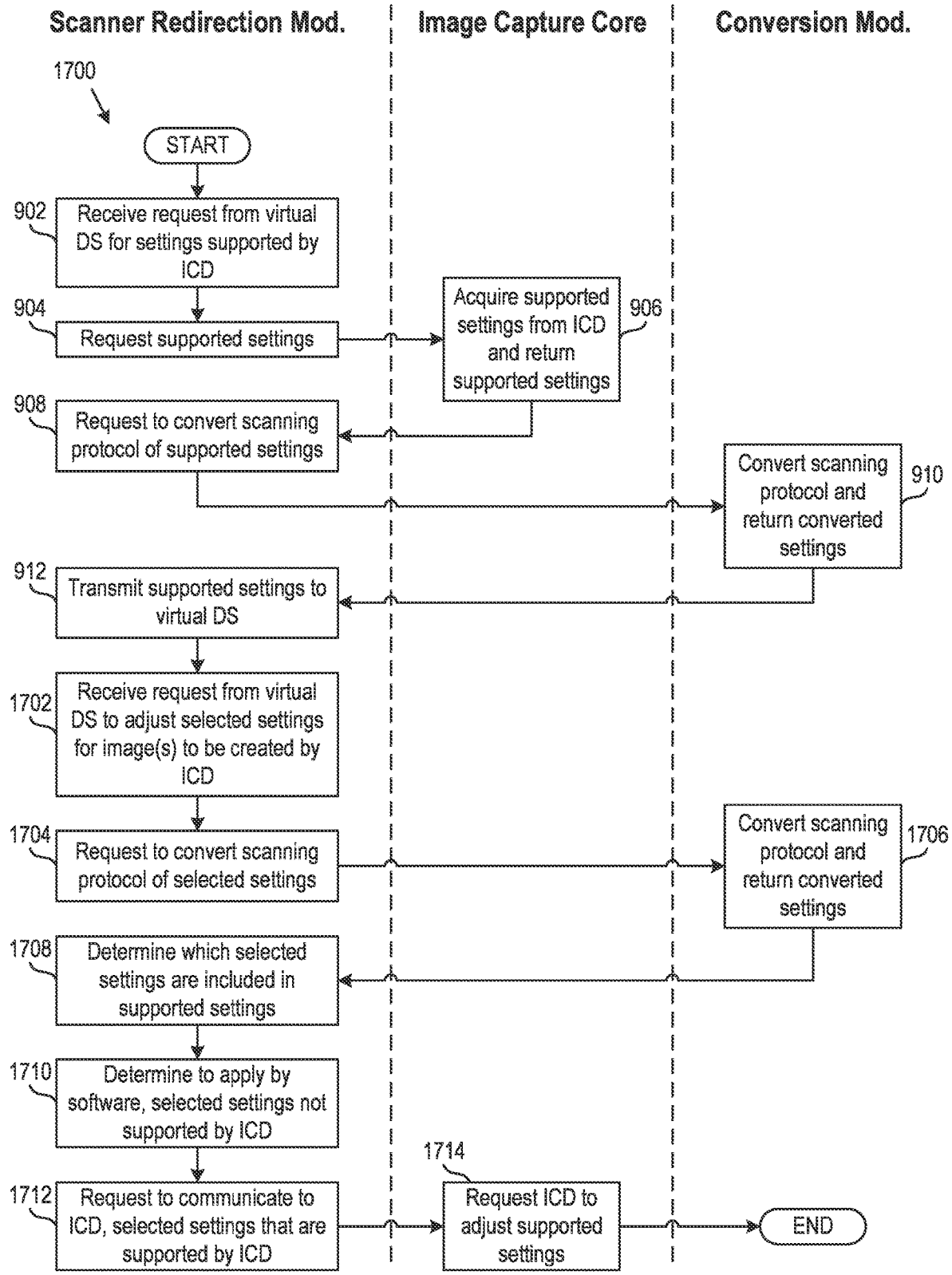
FIG. 17 is a flow diagram of a method performed by the client computing device to acquire settings supported by an image capturing device and to adjust selected settings, according to the fourth embodiment.

FIG. 17 is a flow diagram of a method 1700 performed by client computing device 110 to acquire settings supported by an ICD and to adjust selected settings, according to the fourth embodiment. Method 1700 will be discussed with reference to flatbed scanner 260. However, method 1700 may also be used with other ICDs Items of FIG. 17 that are common with FIG. 9 have the same numbers and will not be explained again.

After step 912, when scanner redirection module 120 transmits supported settings to virtual DS 280, method 1700 moves to step 1702. At step 1702, scanner redirection module 120 receives a request from virtual DS 280 to adjust selected settings for one or more images to be created by flatbed scanner 260. Some of the selected settings received at step 1702 are supported by flatbed scanner 260, while others are not. The desired adjustment is described according to the scanning protocol of application 170.

At step 1704, scanner redirection module 120 makes an API call to conversion module 810 to request conversion module 810 to convert the selected settings from being described according to the scanning protocol of application 170, to being described according to the scanning protocol of scanner redirection module 120. At step 1706, conversion module 810 converts the selected settings to the scanning protocol of scanner redirection module 120 and returns the converted settings to scanner redirection module 120. At step 1708, scanner redirection module 120 determines which of the selected settings from conversion module 810 are supported by flatbed scanner 260, i.e., which of the selected settings were included in supported settings returned by image capture core 820 at step 906. At step 1710, scanner redirection module 120 determines to apply by software, any selected settings that are not supported by flatbed scanner 260.

At step 1712, scanner redirection module 120 makes an API call to image capture core 820 to request image capture core 820 to communicate to flatbed scanner 260, the selected settings that are supported by flatbed scanner 260. At step 1714, image capture core 820 transmits a request to flatbed scanner 260 to adjust the supported settings. After step 1714, method 1700 ends. Scanner redirection module 120 may receive additional requests to adjust settings, at which point steps 1702-1714 are repeated for the additional requests.

Figure 18:
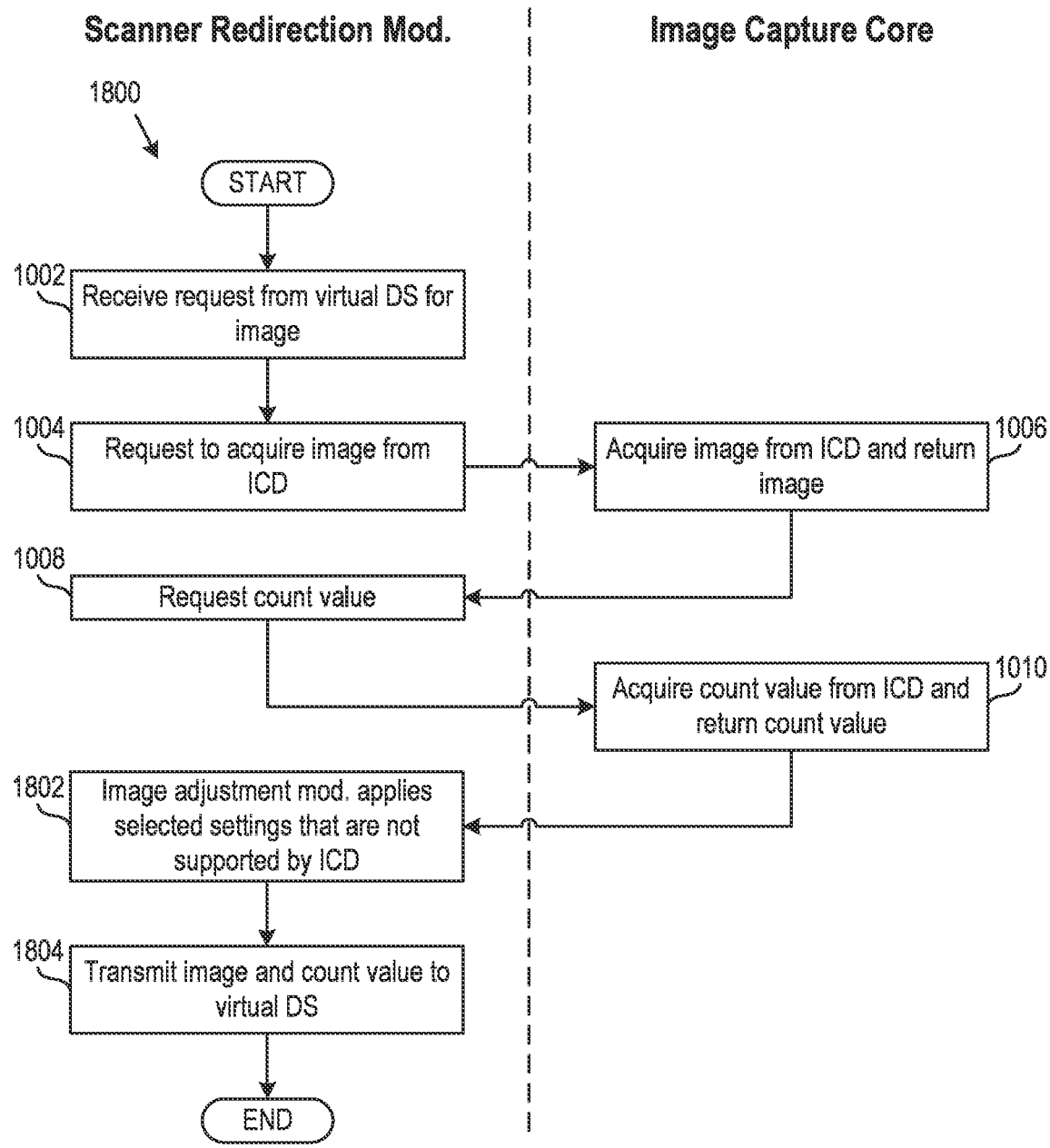
FIG. 18 is a flow diagram of a method performed by the client computing device to acquire an image from an image capturing device, according to the fourth embodiment.

FIG. 18 is a flow diagram of a method 1800 performed by client computing device 110 to acquire an image from an ICD, according to the fourth embodiment. Method 1800 will be discussed with respect to flatbed scanner 260. However, method 1800 may also be used with other ICDs. Items of FIG. 18 that are common with FIG. 10 have the same numbers and will not be explained again.

After step 1010, when image capture core 820 returns a count value to scanner redirection module 120, method 1800 moves to step 1802. At step 1802, image adjustment module 284 applies to the image, selected settings that are not supported by flatbed scanner 260. At step 1804, scanner redirection module 120 transmits the image and count value to virtual DS 280 via sockets 252 and 254. After step 1804, method 1800 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are hard disk drives (HDDs), SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host server, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop system, wherein the remote desktop system includes a client computing device and a remote server, and the client computing device and the remote server execute remote desktop software to establish a remote desktop session, the scanner redirection method comprising:

displaying, by the client computing device, a settings dialog including a plurality of adjustable settings associated with an image capturing device;

detecting, at the client computing device after displaying the settings dialog, user input including selection information, and transmitting the user input by the client computing device to the remote server via the remote desktop session;

receiving, by the client computing device from the remote server via the remote desktop session after transmitting the user input, an identification of settings that were selected by the user through the user input, for adjusting an image that is to be created by the image capturing device;

in response to receiving the identification of the selected settings from the remote server, transmitting, by the client computing device to the image capturing device, at least a first setting of the selected settings that were received from the remote server; and after the image capturing device creates the image, transmitting the image by the client computing device to the remote server via the remote desktop session, and storing the image in the remote desktop system, wherein the first setting has been applied to the image by the image capturing device to adjust an effect of the image, and a second setting has been applied to the image by software executing on the client computing device or the remote server, to adjust another effect of the image.

2. The scanner redirection method of claim 1, wherein the software executes on the remote server, the scanner redirection method further comprising:

after transmitting the image by the client computing device to the remote server, applying the second setting to the image at the remote server using the software.

3. The scanner redirection method of claim 1, further comprising:
before displaying the settings dialog, transmitting a request by the client computing device to the image capturing device, for settings that are supported by the image capturing device; and
in response to receiving the supported settings from the image capturing device, transmitting the supported settings by the client computing device to the remote server.

4. The scanner redirection method of claim 1, wherein the software executes on the client computing device, and the selected settings from the remote server include the second setting, the scanner redirection method further comprising:
applying the second setting to the image at the client computing device using the software, and then transmitting the image by the client computing device to the remote server with the second setting applied thereto.

5. The scanner redirection method of claim 1, further comprising:
before displaying the settings dialog transmitting a request by the client computing device to the image capturing device, for settings that are supported by the image capturing device;
determining that the second setting is not included in the supported settings; and
based on the determining that the second setting is not included in the supported settings, determining to apply the second setting to the image using the software.

6. The scanner redirection method of claim 1, wherein the client computing device transmits the at least a first setting to the image capturing device via a data source of the client computing device and a data source manager of the client computing device that is configured to communicate with the data source.

7. The scanner redirection method of claim 1, wherein the client computing device transmits the at least a first setting to the image capturing device via an image capture core of the client computing device, the scanner redirection method further comprising:
converting, by the client computing device, the at least a first setting from a first scanning protocol used by an application executing on the remote server, to a second scanning protocol used by the remote desktop software.

8. A plurality of non-transitory computer-readable media comprising instructions that are executable in a remote desktop system, wherein the remote desktop system includes a client computing device and a remote server, the client computing device and the remote server execute remote desktop software to establish a remote desktop session, and the instructions when executed cause the remote desktop system to carry out a scanner redirection method comprising:
displaying, by the client computing device, a settings dialog including a plurality of adjustable settings associated with an image capturing device;
detecting, at the client computing device after displaying the settings dialog, user input including selection information, and transmitting the user input by the client computing device to the remote server via the remote desktop session;
receiving, by the client computing device from the remote server via the remote desktop session after transmitting the user input, an identification of settings that were selected by the user through the user input, for adjusting an image that is to be created by the image capturing device;
in response to receiving the identification of the selected settings from the remote server, transmitting, by the client computing device to the image capturing device, at least a first setting of the selected settings that were received from the remote server; and
after the image capturing device creates the image, transmitting the image by the client computing device to the remote server via the remote desktop session, and storing the image in the remote desktop system, wherein the first setting has been applied to the image by the image capturing device to adjust an effect of the image, and a second setting has been applied to the image by software executing on the client computing device or the remote server, to adjust another effect of the image.

9. The non-transitory computer-readable media of claim 8, wherein the software executes on the remote server, the scanner redirection method further comprising:
after transmitting the image by the client computing device to the remote server, applying the second setting to the image at the remote server using the software.

10. The non-transitory computer-readable media of claim 8, the scanner redirection method further comprising:
before displaying the settings dialog, transmitting a request by the client computing device to the image capturing device, for settings that are supported by the image capturing device; and
in response to receiving the supported settings from the image capturing device, transmitting the supported settings by the client computing device to the remote server.

11. The non-transitory computer-readable media of claim 8, wherein the software executes on the client computing device, and the selected settings from the remote server include the second setting, the scanner redirection method further comprising:
applying the second setting to the image at the client computing device using the software, and then transmitting the image by the client computing device to the remote server with the second setting applied thereto.

12. The non-transitory computer-readable media of claim 8, the scanner redirection method further comprising:
before displaying the settings dialog, transmitting a request by the client computing device to the image capturing device for settings that are supported by the image capturing device;
determining that the second setting is not included in the supported settings; and
based on the determining that the second setting is not included in the supported settings, determining to apply the second setting to the image using the software.

13. The non-transitory computer-readable media of claim 8, wherein the client computing device transmits the at least a first setting to the image capturing device via a data source of the client computing device and a data source manager of the client computing device that is configured to communicate with the data source.

14. The non-transitory computer-readable media of claim 8, wherein the client computing device transmits the at least a first setting to the image capturing device via an image capture core of the client computing device, the scanner redirection method further comprising:
converting, by the client computing device, the at least a first setting from a first scanning protocol used by an application executing on the remote server, to a second scanning protocol used by the remote desktop software.

15. A remote desktop system comprising a remote server and a client computing device, wherein the client computing device and the remote server execute remote desktop software to establish a remote desktop session, and wherein the remote desktop system is configured to:
- display, by the client computing device, a settings dialog including a plurality of adjustable settings associated with an image capturing device;
- detect, at the client computing device after displaying the settings dialog, user input including selection information, and transmit the user input by the client computing device to the remote server via the remote desktop session:
- receive, by the client computing device from the remote server via the remote desktop session after transmitting the user input, an identification of settings that were selected by the user through the user input, for adjusting an image that is to be created by the image capturing device;
- in response to receiving the identification of the selected settings from the remote server, transmit, by the client computing device to the image capturing device, at least a first setting of the selected settings that were received from the remote server; and
- after the image capturing device creates the image, transmit the image by the client computing device to the remote server via the remote desktop session, and store the image in the remote desktop system, wherein the first setting has been applied to the image by the image capturing device to adjust an effect of the image, and a second setting has been applied to the image by software executing on the client computing device or the remote server, to adjust another effect of the image.

16. The remote desktop system of claim 15, wherein the software executes on the remote server, and the remote desktop system is further configured to:
- after transmitting the image by the client computing device to the remote server, apply the second setting to the image at the remote server using the software.

17. The remote desktop system of claim 15, further configured to:
- before displaying the settings dialog, transmit a request by the client computing device to the image capturing device, for settings that are supported by the image capturing device; and
- in response to receiving the supported settings from the image capturing device, transmit the supported settings by the client computing device to the remote server.

18. The remote desktop system of claim 15, wherein the software executes on the client computing device, the selected settings from the remote server include the second setting, and the remote desktop system is further configured to:
- apply the second setting to the image at the client computing device using the software, and then transmit the image by the client computing device to the remote server with the second setting applied thereto.

19. The remote desktop system of claim 15, further configured to:
- before displaying the settings dialog, transmit a request by the client computing device to the image capturing device for settings that are supported by the image capturing device;
- determine that the second setting is not included in the supported settings; and
- based on the determining that the second setting is not included in the supported settings, determine to apply the second setting to the image using the software.

20. The remote desktop system of claim 15, wherein the client computing device transmits the at least a first setting to the image capturing device via a data source of the client computing device and a data source manager of the client computing device that is configured to communicate with the data source.

* * * * *